(12) United States Patent
Kanto

(10) Patent No.: US 9,952,038 B2
(45) Date of Patent: Apr. 24, 2018

(54) SHAPE MEASUREMENT DEVICE, STRUCTURE PRODUCTION SYSTEM, SHAPE MEASUREMENT METHOD, STRUCTURE PRODUCTION METHOD, AND SHAPE MEASUREMENT PROGRAM

(71) Applicant: NIKON CORPORATION, Tokyo (JP)

(72) Inventor: Kenta Kanto, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/779,865

(22) PCT Filed: Mar. 14, 2014

(86) PCT No.: PCT/JP2014/056889
§ 371 (c)(1),
(2) Date: Sep. 24, 2015

(87) PCT Pub. No.: WO2014/156723
PCT Pub. Date: Oct. 2, 2014

(65) Prior Publication Data
US 2016/0054119 A1    Feb. 25, 2016

(30) Foreign Application Priority Data

Mar. 27, 2013  (JP) .................................. 2013-065470

(51) Int. Cl.
*G01B 11/30* (2006.01)
*G01B 11/25* (2006.01)
(Continued)

(52) U.S. Cl.
CPC .......... *G01B 11/2518* (2013.01); *G01B 11/24* (2013.01); *G01B 11/25* (2013.01);
(Continued)

(58) Field of Classification Search
CPC ................ G01B 11/24; G01B 11/2433; G01B 21/0016; G01B 11/245; G01B 11/306
(Continued)

(56) References Cited

U.S. PATENT DOCUMENTS

| 6,064,759 A | 5/2000 | Buckley et al. |
| 2004/0150859 A1* | 8/2004 | Hayashi ................ G06T 1/0021 |
| | | 358/3.28 |

(Continued)

FOREIGN PATENT DOCUMENTS

| CN | 1481980 (A) | 3/2004 |
| CN | 101363724 (A) | 2/2009 |

(Continued)

OTHER PUBLICATIONS

International Search Report issued by the Japanese Patent Office in corresponding International Application No. PCT/JP2014/056869, dated May 13, 2014, 5 pages.

(Continued)

*Primary Examiner* — Tarifur Chowdhury
*Assistant Examiner* — Md M Rahman
(74) *Attorney, Agent, or Firm* — Finnegan, Henderson, Farabow, Garrett & Dunner, LLP

(57) ABSTRACT

The time and labor required to set an extraction region of point cloud data is decreased. A shape measuring apparatus includes a projecting unit that projects a measurement beam onto a measurement region of a measurement target, an imaging unit that captures an image of the measurement target onto which the measurement beam is projected, a movement mechanism that relatively moves the projecting unit or the imaging unit with respect to the measurement target so that a position of the measurement region of the measurement target changes, and an extraction region setting unit that sets an extraction region for image information (Continued)

used for calculating a position of the measurement target from capture images captured by the imaging unit, on the basis of positions of images of the measurement beam captured by the imaging unit when the measurement beam is projected onto different measurement regions.

24 Claims, 12 Drawing Sheets

(51) Int. Cl.
    *G01B 11/24*     (2006.01)
    *G06T 7/00*     (2017.01)
    *G06T 7/521*     (2017.01)
    *G06T 7/55*     (2017.01)

(52) U.S. Cl.
    CPC ............. *G06T 7/001* (2013.01); *G06T 7/521* (2017.01); *G06T 7/55* (2017.01); *G06T 2207/30164* (2013.01)

(58) Field of Classification Search
    USPC ........................................................ 356/612
    See application file for complete search history.

(56) References Cited

U.S. PATENT DOCUMENTS

| | | | | |
|---|---|---|---|---|
| 2007/0223019 | A1* | 9/2007 | Maeyama | G03G 15/6585 358/1.9 |
| 2009/0040533 | A1 | 2/2009 | Takahashi et al. | |
| 2009/0205088 | A1 | 8/2009 | Crampton et al. | |
| 2010/0239124 | A1 | 9/2010 | Hazeyama et al. | |
| 2011/0064305 | A1* | 3/2011 | Ueno | G06K 9/00449 382/165 |
| 2011/0270562 | A1* | 11/2011 | Ito | G01B 11/25 702/94 |
| 2012/0026510 | A1 | 2/2012 | Crampton et al. | |
| 2012/0301052 | A1* | 11/2012 | Tsukada | H04N 13/0029 382/284 |
| 2013/0129184 | A1* | 5/2013 | Bergmann | B29C 67/00 382/141 |
| 2013/0163883 | A1* | 6/2013 | Takemoto | G06K 9/00382 382/199 |
| 2013/0250079 | A1* | 9/2013 | Nakamura | A61B 1/00009 348/68 |
| 2015/0049186 | A1* | 2/2015 | Pettersson | G01B 21/047 348/135 |

FOREIGN PATENT DOCUMENTS

| | | |
|---|---|---|
| CN | 102495026 (A) | 6/2012 |
| CN | 102859318 (A) | 1/2013 |
| JP | 2009-068998 | 4/2009 |
| JP | 2009-198342 | 9/2009 |
| JP | 2009-198342 A | 9/2009 |
| JP | 2009-534969 | 9/2009 |

OTHER PUBLICATIONS

PCT International Preliminary Examination Report for corresponding International Application No. PCT/JP2014/056889 dated Sep. 29, 2015, and English translation thereof.
Notification of Reasons for Refusal issued by the Japanese Patent Office in Japanese Patent Application No. 2015-508302, dated May 24, 2016.
Extended European Search Report in corresponding European Application No. EP 14773174.9 dated Oct. 19, 2016.
Office Action issued by the State Intellectual Property Office of the People's Republic of China dated May 25, 2017 in a counterpart Application No. 201480018343.9, and English translation thereof.
Office Action issued by the European Patent Office dated Nov. 11, 2017 in counterpart European Patent Application No. 14773174.9.
Office Action issued by the Taiwan Intellectual Property Office dated Nov. 1, 2017 in counterpart Taiwanese Application No. 103109626, and Partial English translation thereof.
Office Action issued by the European Patent Office dated Nov. 24, 2017 in counterpart European Patent Application No. 14773174.9.
Chinese Office Action dated Feb. 8, 2018, in corresponding Chinese Application No. 201480018343.9 (8 pages for original document and 10 pages for translation).

* cited by examiner

SHAPE MEASUREMENT DEVICE, STRUCTURE PRODUCTION SYSTEM, SHAPE MEASUREMENT METHOD, STRUCTURE PRODUCTION METHOD, AND SHAPE MEASUREMENT PROGRAM

CROSS REFERENCE TO RELATED APPLICATIONS

This is the national stage of International Application No. PCT/JP2014/056889 filed on Mar. 14, 2014 which claims priority to Japanese Patent Application No. 2013-065470 filed on Mar. 27, 2013. The contents of the aforementioned applications are incorporated herein by reference in their entirety.

BACKGROUND

The present invention relates to a shape measuring apparatus, a structure manufacturing system, a shape measuring method, a structure manufacturing method, and a shape measuring program for measuring a shape by non-contact optical scanning.

Methods for measuring a three-dimensional shape of a measurement target in a non-contact manner include a light-section method of projecting a slit-shaped light flux onto the measurement target, capturing a line-shaped image (hereinafter referred to as "light-section line") made of curves and lines corresponding to a contour shape of the measurement target from the slit-shaped light flux, and generating point cloud data of the measurement target from the image data in which an image of this light-section line is captured (refer to Japanese Unexamined Patent Application Publication No. 2009-534969A, for example).

SUMMARY OF EMBODIMENTS

In the above-described light-section method, the three-dimensional shape of the measurement target is measured by scanning the measurement target along a surface thereof using a line-shaped light flux, and generating point cloud data from a capture image in which an image of the light-section line occurring on the surface of the measurement target is captured. However, this capture image may include an image occurring due to multiple reflection of the light-section line (discontinuous points or the like, for example) or the like, and the image differs from the image of the light-section line. Conventionally, a region that is likely to include such an image is verified on a display screen of the capture image, and a range (extraction region) in which the point cloud data is acquired is set.

Nevertheless, in such a method for setting an extraction region, the region where a luminous point of light (hereinafter referred to as "abnormal point") that differs from the light-section line occurs in the scanning process may vary in a case of a measurement target having a complex shape or the like. In such a case, properly omitting the abnormal point and setting the extraction region for generating the point cloud data require time and labor.

The present invention has been made to solve the above problems, and an object of the present invention is to provide a shape measuring apparatus, a structure manufacturing system, a shape measuring method, a structure manufacturing method, and a shape measuring program capable of decreasing the time and labor required to set an extraction region of point cloud data used for calculating a three-dimensional shape of a measurement target.

An embodiment of the present invention is a shape measuring apparatus that includes a projecting unit that projects a measurement beam onto a measurement region of a measurement target, an imaging unit that captures an image of the measurement region when the measurement beam is projected, a movement mechanism that relatively moves one of the projecting unit and the imaging unit with respect to the measurement target so that a position of the measurement region of the measurement target changes, and an extraction region setting unit that sets an extraction region for image information used for calculating a position of the measurement target from capture images captured by the imaging unit, on the basis of positions of images of the measurement beam captured by the imaging unit when the measurement beam is projected onto different measurement regions.

Further, an embodiment of the present invention is a shape measuring apparatus that includes a projecting unit that projects a measurement beam onto a measurement region of a measurement target, an imaging unit that captures an image of the measurement region when the measurement beam is projected, a movement mechanism that relatively moves one of the projecting unit and the imaging unit with respect to the measurement target so that a position of the measurement region of the measurement target changes, a display unit that displays a plurality of capture images super imposed on each other, the plurality of capture images being captured by the imaging unit when the measurement beam is projected onto different measurement regions, an input unit for inputting information related to a selection region for selecting a portion of the capture images, an extraction region setting unit that sets an extraction region on the basis of information related to the selection region, and a position calculating unit that calculates a position of the measurement target from a capture image within the extraction region, the capture image being among capture images captured by the imaging unit.

Further, an embodiment of the present invention is a structure manufacturing system that includes a design apparatus that generates structure design information relating to a shape of a structure, a molding apparatus that forms the structure on the basis of the structure design information, the above-described shape measuring apparatus that measures a shape of the formed structure on the basis of a capture image, and an inspecting apparatus that compares shape information acquired by the measurement with the structure design information.

Further, an embodiment of the present invention is a shape measuring method that includes an imaging step of generating a capture image in which an image of a measurement region of a measurement target is captured, a projecting step of projecting a pattern onto the measurement target from a direction that differs from an imaging direction in the imaging step so that a capture image to be captured in the imaging step is captured as an image in which the pattern is projected onto the measurement region of the measurement target, an extraction region setting step of setting an extraction region indicating an image of an extraction target in the capture image from an image having at least, among a plurality of the capture images in which images of different measurement regions of the measurement target are captured in the imaging step, a capture image captured when an image of the pattern is positioned on an outermost side of the measurement region, and a position calculating step of calculating a position of the measurement target on the basis of the capture image of the extraction region within the capture image generated in the imaging step.

Further, an embodiment of the present invention is a structure manufacturing method that includes a structure design information generating step of generating structure design information relating to a shape of a structure, a structure forming step of forming the structure on the basis of the structure design information, a measuring step of measuring a shape of the formed structure on the basis of a capture image generated using the above-described shape measuring method, and a comparing step of comparing shape information acquired by the measurement with the structure design information.

Further, an embodiment of the present invention is a shape measuring program that causes a computer to execute a method. The method includes an imaging step of generating a capture image in which an image of a measurement target is captured, a projecting step of projecting a pattern onto a measurement region of the measurement target from a direction that differs from an imaging direction in the imaging step so that a capture image to be captured in the imaging step is captured as an image in which the pattern is projected onto the measurement target, and an extraction region setting step of setting an extraction region for extracting image information used for calculating a position of the measurement target from a capture image on the basis of images of the pattern in which images of different measurement regions of the measurement target are captured in the imaging step.

EXEMPLARY EFFECTS OF EMBODIMENTS

According to the embodiment including teaching by the present invention, it is possible to decrease the time and labor required to set an extraction region of point cloud data used for calculating a three-dimensional shape of a measurement target.

BRIEF DESCRIPTION OF THE DRAWING(S)

Figure 16A:
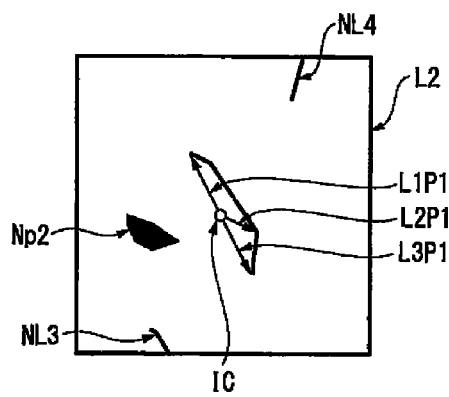
Figure 16B:
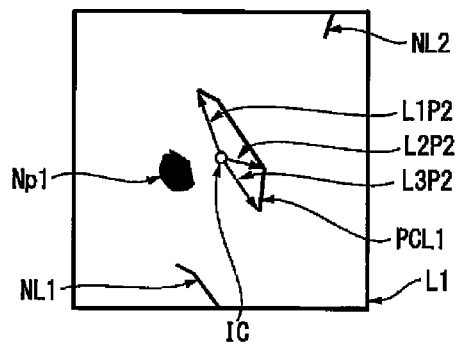
Figure 16C:
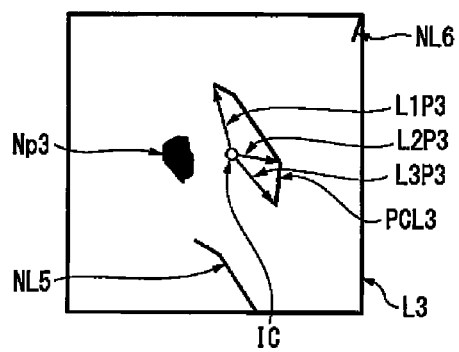

FIGS. 16A, 16B, and 16C are schematic views, each illustrating an example of an extraction region set by the extraction region setting unit of the embodiment.

DESCRIPTION OF EMBODIMENTS

Embodiments of the present teaching will be described hereinafter with reference to the drawings.
Overview FIG. 1 is a schematic view for providing an overview of a shape measuring apparatus 100 of present teaching.

The shape measuring apparatus 100 scans a measurement target 3 with a light-section line PCL, and generates point cloud data representing a three-dimensional shape of the measurement target 3 on the basis of a capture image of the light-section line PCL. The shape measuring apparatus 100 is capable of setting an extraction region Ap for selecting an image to be utilized when acquiring point cloud data.

Figure 1:
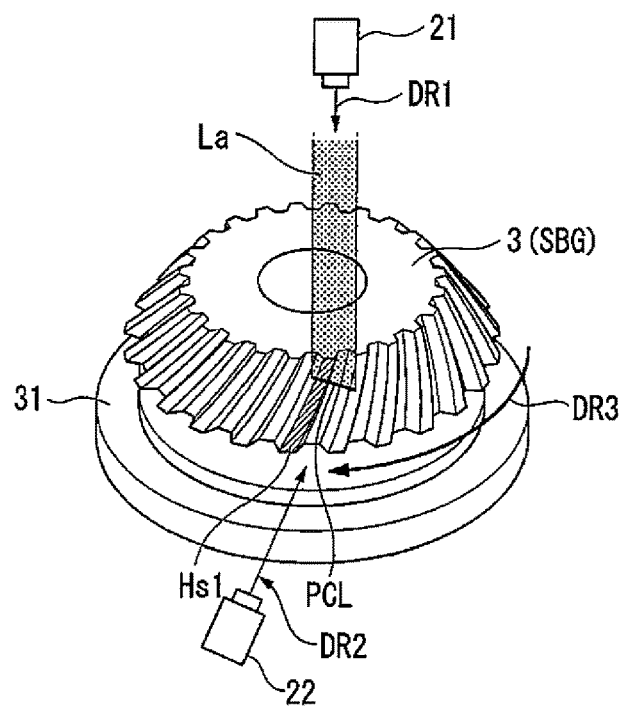
FIG. 1 is a schematic view for providing an overview of the present invention.

As illustrated in FIG. 1, the shape measuring apparatus 100 irradiates, using a projecting unit 21, the measurement target 3 with a line-shaped measurement beam La from an irradiation direction DR1 that is determined in accordance with a normal direction of a surface of the measurement target 3. The light-section line PCL is formed on the surface of the measurement target 3 by the line-shaped measurement beam La. The following describes a case in which the measurement target 3 is a spiral bevel gear SBG as an example. In this example, the projecting unit 21 irradiates, with the line-shaped measurement beam La, a measurement region within a measurement target range Hs1 of a tooth surface of the spiral bevel gear 3 (SBG). An imaging unit 22 sets a direction (tooth trace direction) in which an uneven shape of the measurement target 3 extends as an imaging direction DR2, captures the image of the light-section line PCL projected onto the surface within the measurement target range Hs1 of the tooth surface of the spiral bevel gear 3 (SBG), and generates a capture image. It should be noted that "measurement region" in this specification refers to at least a region of the surface of the measurement target 3 within the imaging range of the imaging unit 22, and includes the range in which the line-shaped measurement beam La projected from the projecting unit 21 is irradiated. However, the measurement region does have to include the entire region of the surface of the measurement target 3 where both conditions, i.e., the imaging range of the imaging unit 22 and the irradiation range of the measurement beam La, are satisfied. For example, a region excluding an end portion of the line of the line-shaped measurement beam La as well as the vicinity thereof may be set as the measurement region. Additionally, when a plurality of teeth of the gear of the measurement target 3 is irradiated with the line-shaped measurement beam La, the measurement region may be a region within the range irradiated with the measurement beam La corresponding to a tooth set as the measurement target range. According to the present teaching, within the measurement target range Hs1, a section that is positioned within the irradiation range of the measurement beam La as well as within the imaging range of the imaging unit is described as the measurement region.

When the measurement target 3 is moved in the circumferential direction (that is, a movement direction DR3) of the gear, the measurement region onto which the light-section line PCL is projected moves, and thus the surface of the measurement target 3 is scanned. Accordingly, a capture image L1 corresponding to a projected position of the light-section line PCL is acquired on a display screen 46 as illustrated in FIG. 2, for example.

Figure 2:
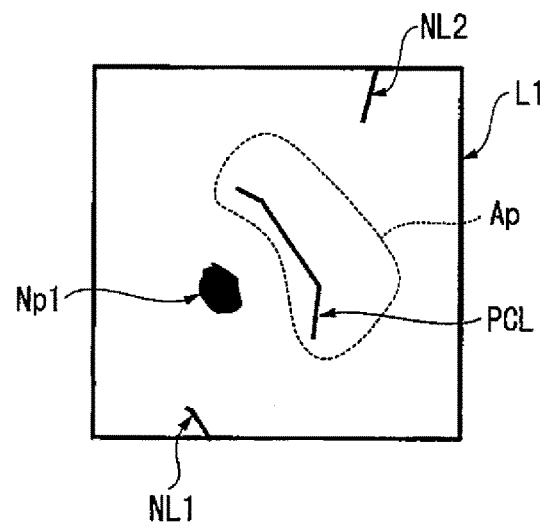
FIG. 2 is a schematic view illustrating an example of a capture image.

FIG. 2 is a schematic view illustrating an example of a capture image. In the capture image L1, as illustrated in FIG. 1, a portion of the measurement beam may be reflected in the measurement region, reaching a position different from the measurement region. The measurement beam thus reaching a position different from the measurement region causes the generated image to be a product of multiple reflection. Such multiple reflected light becomes a noise component Np that results in an error in the shape measurement result. Furthermore, a noise component NL caused by ambient light may be superimposed from a tooth surface adjacent to the tooth surface (hereinafter, also simply described as the "tooth surface Hs1") included in the measurement target range Hs1. In the example illustrated in FIG. 2, a multiple reflected light image (noise Np1) and adjacent tooth surface images (noise NL1, noise NL2) appear around the light-section line PCL in the capture image as abnormal points.

As a result, when point cloud data is generated from the capture image and the three-dimensional shape of the measurement target 3 is measured, it is necessary to set, in the capture image, the extraction region Ap in which abnormal points such as the multiple reflected light image and adjacent tooth surface images are not included and to generate the point cloud data. However, the point cloud data of the gear is, for example, generated on the basis of capture images in which the images of the light-section line PCL are captured in a plurality of positions in the tooth trace direction, that is, a plurality of capture images. Here, the positions of the multiple reflected light image and adjacent tooth surface images change according to the image capturing position, and thus the positions in which the abnormal points are included within the capture image differ for each capture image. Accordingly, if the extraction region Ap is set for each of the plurality of capture images so as to exclude abnormal points, it is possible to set the extraction region Ap for all capture images used to create point cloud data so that abnormal points are not included. Nevertheless, conventionally, the extraction region Ap is set for each of the plurality of capture images, resulting in a problematic amount of time required to set the extraction region Ap.

Hence, the shape measuring apparatus 100 of the present teaching is configured to be able to set the extraction region Ap collectively for a plurality of capture images. According to the present teaching, the extraction region is set on the basis of an image having at least, among a plurality of capture images of different measurement regions captured by the imaging unit, a capture image captured when an image of the measurement beam is positioned on an outermost side of the measurement region. For example, as described below with reference to FIG. 10, a composite image (a logical sum image, for example) of a plurality of capture images is displayed, making it possible to collectively display the extraction region Ap of the plurality of capture images on a single composite image and to easily recognize an image captured when the image of the measurement beam is positioned on the outermost side. Additionally, the shape measuring apparatus 100 may be configured to extract image data of a position farthest from an image center point.

Thus, according to the shape measuring apparatus 100 of the present teaching, it is possible to collectively set the extraction region Ap for a plurality of capture images, making it possible to decrease the time required to set the extraction region Ap compared to a case in which the extraction region Ap is set for each capture image.

[First Embodiment]

Configuration of Shape Measuring Apparatus 100

Figure 3:
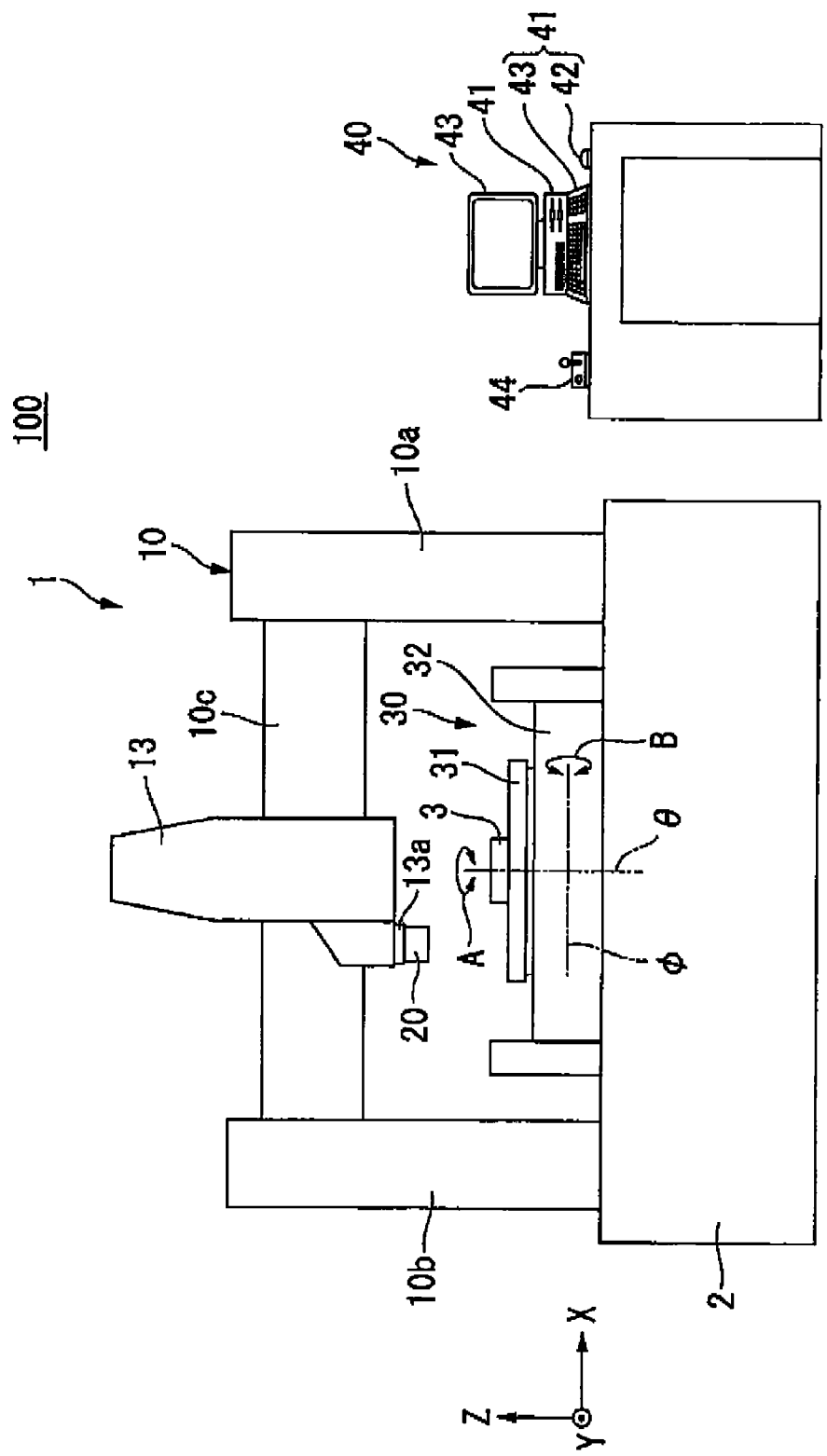
FIG. 3 is a configuration diagram illustrating an example of a general configuration of a shape measuring apparatus according to a first embodiment of the present invention.

FIG. 3 is a configuration diagram illustrating an example of a general configuration of the shape measuring apparatus 100 according to a first embodiment of the present teaching. The shape measuring apparatus 100 includes a measuring unit main body 1 and a control unit 40 (refer to FIG. 4).

As illustrated in FIG. 3, the measuring unit main body 1 includes a base 2 having a horizontal top surface (reference surface), a moving unit 10 that is provided on the base 2 and supports and moves a measurement head 13, and a support device 30 that is provided on the base 2 and that has the measurement target 3 placed thereon. Here, the shape measuring apparatus 100 of this embodiment measures a surface shape of the measurement target 3 having a surface of an uneven shape that is cyclically arranged in the circumferential direction and extends in a direction different from the circumferential direction, such as a gear or turbine.

An orthogonal coordinate system having the reference surface of the base 2 as a reference is defined as follows. That is, an X axis and Y axis orthogonal to each other are established parallel with the reference surface, and a Z axis is established in a direction orthogonal to the reference surface. Further, a guide rail (not illustrated) that extends in a Y direction (a direction orthogonal to the paper surface; a front-back direction) is provided on the base 2.

The moving unit 10 includes a horizontal frame 10c that is provided on the guide rail so as to be freely movable in the Y direction and is disposed so as to horizontally extend between a supporting post 10a and a supporting post 10b that is paired with the supporting post 10a, thereby forming a gate-type structure. Additionally, the moving unit 10 includes a carriage (not illustrated) provided on the horizontal frame 10c so as to be freely movable in the X direction (left-right direction), and the measurement head 13 provided on the carriage so as to be freely movable in the Z direction (up-down direction).

A detection unit 20 that detects a shape of the measurement target 3 is provided on a lower portion of the measurement head 13. The detection unit 20 is supported on the measurement head 13 so as to detect the relative position of the measurement target 3 disposed below the detection unit 20, with the detection unit 20. The position of the detection unit 20 can be moved by controlling the position of the measurement head 13. Additionally, a head rotation mechanism 13a that rotates the detection unit 20 about an axis parallel with the Z-axis direction is included between the detection unit 20 and the measurement head 13.

Further, a head driving unit 14 (refer to FIG. 4) that electrically moves the measurement head 13 in three directions (X, Y, and Z directions) on the basis of an input driving signal, and a head position detection unit 15 (refer to FIG. 4) that detects coordinates of the measurement head 13 and outputs a signal indicating the coordinate values of the measurement head 13 are provided in the moving unit 10.

The support device 30 is provided on the base 2. The support device 30 includes a stage 31 and a support table 32. On the stage 31, the measurement target 3 is placed and held. The support table 32 rotatably supports the stage 31 about rotation axes in two directions orthogonal to each other to rotate the stage 31 diagonally or horizontally with respect to the reference surface. The support table 32 of this embodiment supports the stage 31 so that the stage 31 is rotatable about a rotation axis θ that extends vertically (in the Z-axis direction) within a horizontal plane in a direction A illustrated in FIG. 3, and is rotatable about a rotation axis φ that extends horizontally (in the X-axis direction) in a direction B illustrated in FIG. 3, for example.

Further, the support device 30 is provided with a stage driving unit 33 (refer to FIG. 4) that electrically rotationally drives the stage 31 about the rotation axis θ and the rotation axis φ on the basis of an input driving signal, and a stage position detection unit 34 (refer to FIG. 4) that detects the coordinates of the stage 31 and outputs a signal indicating the stage coordinate values.

The control unit 40 includes an input device 41 (a mouse 42 and a keyboard 43), a joystick 44, a display device 45, and a controller 51. The controller 51 controls the measuring unit main body 1. The details will be described below. The input device 41 includes the mouse 42, the keyboard 43, and the like for inputting various instruction information. The display device 45 displays a measurement screen, an instruction screen, a measurement result, the extraction region Ap of point cloud data, and the like on the display screen 46. The configuration of the measuring unit main body 1 will now be described with reference to FIG. 4.

Figure 4:
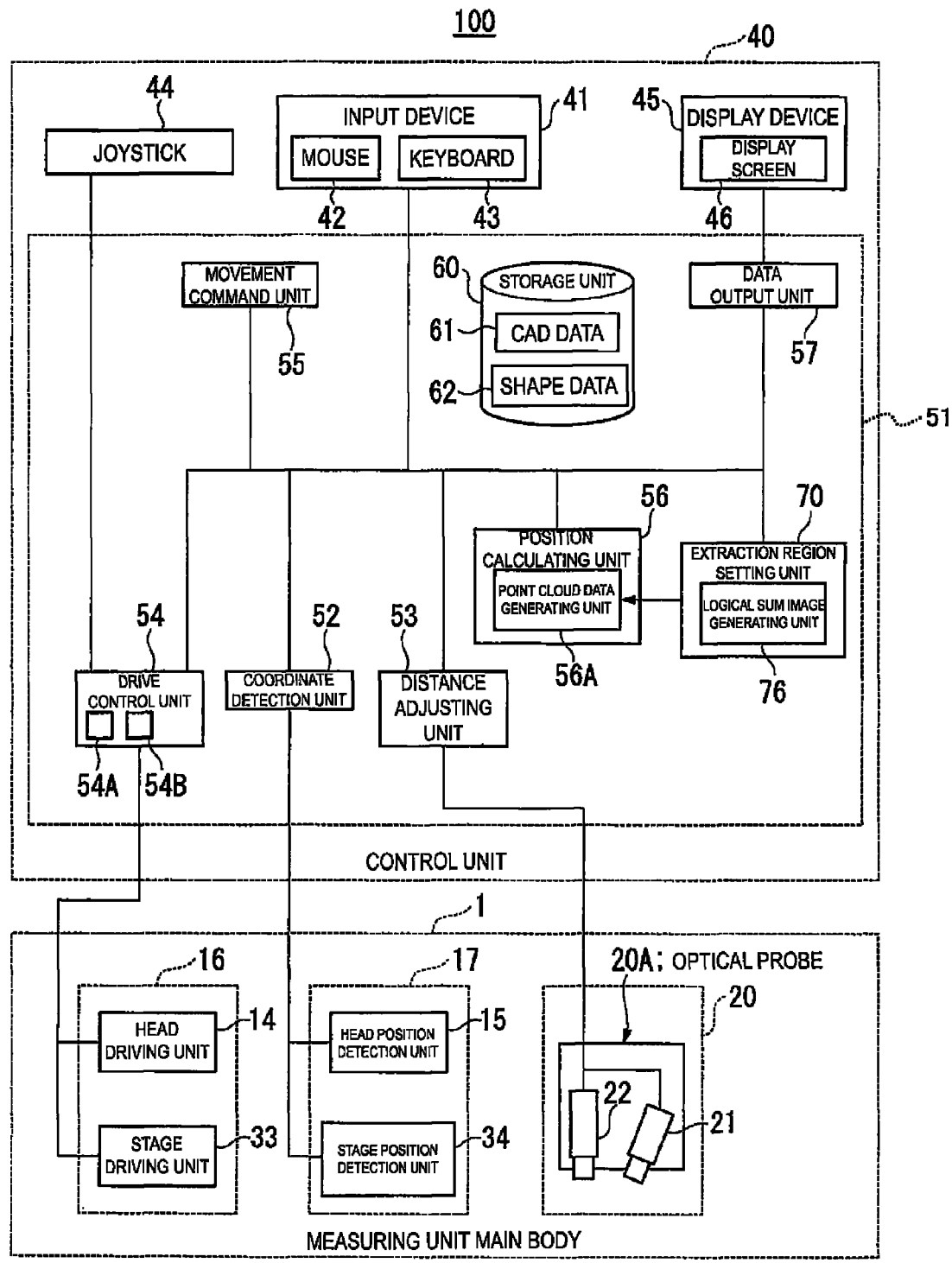
FIG. 4 is a configuration diagram illustrating an example of a configuration of a measuring unit main body according the embodiment.

FIG. 4 is a configuration diagram illustrating an example of a configuration of the measuring unit main body of this embodiment. The measuring unit main body 1 includes a driving unit 16, a position detection unit 17, and the detection unit 20. The driving unit 16 includes the aforementioned head driving unit 14 and the stage driving unit 33.

The head driving unit 14 includes a Y-axis motor that drives the supporting posts 10a, 10b in the Y direction, an X-axis motor that drives the carriage in the X direction, a Z-axis motor that drives the measurement head 13 in the Z direction, and a head rotation motor that rotates the detection unit 20 about an axis parallel with the Z-axis direction. The head driving unit 14 receives a driving signal supplied from a drive control unit 54 described below. The head driving unit 14 electrically moves the measurement head 13 in three directions (X, Y, and Z directions) on the basis of the driving signal.

The stage driving unit 33 includes a rotary axis motor that rotationally drives the stage 31 about the rotation axis θ, and a tilt axis motor that rotationally drives the stage 31 about the rotation axis φ. Further, the stage driving unit 33 receives a driving signal supplied from the drive control unit 54, and electrically rotates the stage 31 about the rotation axis θ and the rotation axis φ on the basis of the received driving signal. Further, the stage driving unit 33 relatively moves the position of the measurement target 3 to be irradiated with the measurement beam La in the movement direction DR3 of the detection unit 20 established in accordance with the circumferential direction. Further, the stage driving unit 33 relatively moves the detection unit 20 with the measurement target 3, in the movement direction DR3 of the detection unit 20. Further, the stage driving unit 33 rotationally moves the measurement target 3, with a center axis AX of the measurement target 3 aligned with the rotation axis θ of rotational movement.

Here, when the shape of the gear serving as the measurement target 3 is measured, for example, the stage driving unit 33 relatively moves the position of the measurement target 3 to be irradiated with the measurement beam La in the movement direction DR3 of the detection unit 20 established in accordance with a direction of a tooth width of a tooth.

The position detection unit 17 includes the head position detection unit 15 and the aforementioned stage position detection unit 34.

The head position detection unit 15 includes an X-axis encoder, a Y-axis encoder, a Z-axis encoder, and a head rotation encoder that respectively detect the X-axis position, Y-axis position, Z-axis position, and head installation angle of the measurement head 13. Further, the head position detection unit 15 detects the coordinates of the measurement head 13 with these encoders, and supplies a signal indicating the coordinate values of the measurement head 13 to a coordinate detection unit 52 described below.

The stage position detection unit 34 includes a rotary axis encoder and a tilt axis encoder that respectively detect the rotational positions about the rotation axis θ and the rotation axis φ of the stage 31. Further, the stage position detection unit 34 detects the rotational positions about the rotation axis θ and the rotation axis φ of the stage 31 using these encoders, and supplies signals indicating the detected rotational positions to the coordinate detection unit 52.

The detection unit 20 includes the projecting unit 21 and an optical probe 20A, and detects a surface shape of the measurement target 3 by a light-section method. In other words, the detection unit 20 holds the projecting unit 21 and the imaging unit 22 so that the relative position of the projecting unit 21 with respect to the imaging unit 22 do not change.

The projecting unit 21 irradiates, with the measurement beam La having a predetermined light quantity distribution, the measurement region (surface) of the measurement target in the irradiation direction DR1 established in accordance with the normal direction of the surface of the measurement target 3, on the basis of a control signal that controls the irradiation with light supplied from a distance adjusting unit 53 described later. The measurement beam La has a light quantity distribution formed in a line shape when a flat surface is irradiated, for example. In this case, the measurement beam La with which the measurement target 3 is irradiated is formed by projecting a line-shaped projection pattern in which a longer direction is set in accordance with the uneven shape of the measurement target 3 onto the measurement target 3. The head rotation mechanism 13a is driven and controlled so that this longer direction becomes such a direction described above. Such a measurement beam La may be formed in a line shape by light emitted from a point light source being refracted or swept, for example. The light-section line PCL is formed on the surface of the measurement target 3 by the measurement beam La formed in this line shape. That is, the projecting unit 21 projects a pattern onto the measurement target 3 from a direction that differs from the direction in which the imaging unit 22 carries out image capturing so that a capture image to be captured by the imaging unit 22 is captured as an image in which the pattern is projected onto the measurement region of the measurement target 3.

That is, when the shape of the gear serving as the measurement target 3 is measured, for example, a tooth of the gear of the measurement target 3 is irradiated with the measurement beam La in the normal direction of the tooth surface of the tooth. In this case, the light-section line PCL is formed in accordance with the surface shape (the shape of the tooth surface of the gear, for example) of the measurement target 3.

The imaging unit 22 generates a capture image in which an image of the measurement region of the measurement target 3 is captured. Specifically, the imaging unit 22 captures the surface irradiated with the measurement beam La from the imaging direction DR2 (a direction that differs from the circumferential direction of the tooth when the measurement target 3 is a gear) that differs from the irradiation direction DR1, and generates an image for measurement. For example, the imaging unit 22 of this embodiment sets the direction in which the uneven shape of the measurement target 3 extends as the imaging direction DR2, and generates a capture image in which the image of the measurement beam La is captured. Here, when the measurement target 3 is a gear, the direction in which the uneven shape (that is, the tooth of the gear) of the measurement target 3 extends is, for example, the direction of the tooth trace of the gear. In this case, the imaging unit 22 generates, as a capture image, an image of the tooth surface on which the measurement beam La is projected from the direction of the tooth trace of the gear serving as the measurement target 3. The imaging unit 22 thus captures the image of the light-section line PCL formed on the surface of the measurement target 3 by the irradiation light from the projecting unit 21. It should be noted that, while the imaging direction DR2 is set in accordance with the direction in which the uneven shape of the measurement target 3 extends, the imaging direction DR2 does not necessarily need to match the direction in which the uneven shape extends, and may be a direction in which a convex portion or a concave portion of the measurement area is not hidden by an adjacent convex portion as viewed from the imaging unit 22, centered at the extending direction.

Further, the imaging unit 22 captures a shadow pattern formed by projecting the measurement beam La on the surface of the measurement target 3, and supplies information on the capture image to the distance adjusting unit 53. Accordingly, the control unit 40 acquires shape measurement data. The imaging unit 22 includes a solid-state imaging element, such as a charge coupled device (CCD), complementary metal oxide semiconductor (C-MOS) sensor, or the like.

Here, for example, when the shape of the gear serving as the measurement target 3 is measured, the imaging unit 22 generates a capture image in which the light-section line is captured from the imaging direction DR2 established in accordance with an orientation of the tooth trace of the tooth surface that is irradiated with the measurement beam La. Further, the projecting unit 21 and the imaging unit 22 are fixed to the same housing, and the projection direction of the projecting unit 21, the imaging direction of the imaging unit 22, and the positions of the projecting unit 21 and the imaging unit 22 do not change even if the measurement position changes.

Next, the control unit 40 will be described. As described above, the control unit 40 includes the controller 51, the input device 41, the joystick 44, and the display device 45. The input device 41 includes the mouse 42 and the keyboard 43 used by a user to input various instruction information, detects the instruction information input by the mouse 42 and the keyboard 43, and writes and stores the detected instruction information in a storage unit 60 described below. A type of the measurement target 3, for example, is input to the input device 41 of this embodiment as instruction information. For example, when the measurement target 3 is a gear, the type of gear (a spur gear SG, a helical gear HG, a bevel gear BG, a spiral bevel gear SBG, a worm gear WG, or the like, for example) corresponding to the type of the measurement target 3 is input as instruction information to the input device 41.

Further, the input device 41 is used to set the extraction region Ap of the point cloud data used for three-dimensional shape measurement, from a capture image (the capture image of the light-section line PCL projected onto the measurement target 3) displayed on the display device 45, as described below. The setting of the extraction region Ap will be described below.

The display device 45 receives measurement data (coordinate values of all measurement points) and the like supplied from a data output unit 57. The display device 45 displays the received measurement data (coordinate values of all measurement points) and the like. Further, the display device 45 displays the measurement screen, the instruction screen, and the like.

The controller 51 includes the coordinate detection unit 52, the distance adjusting unit 53, the drive control unit 54, a movement command unit 55, a position calculating unit 56, a point cloud data generating unit 56A, the data output unit 57, the storage unit 60, and an extraction region setting unit 70.

The storage unit 60 stores in advance positions in directions in which the uneven shape of the measurement target 3 extends, and information indicating the direction in which the uneven shape extends for each of the positions in directions in which the uneven shape extends, for each type of the measurement target 3. For example, the storage unit 60 stores in advance positions in the tooth trace directions of the gear, and information indicating the tooth trace direction for each of the positions in the tooth trace directions. In other words, the storage unit 60 stores the movement directions of measurement points in association with gear types in advance.

Further, for each type of the measurement target 3, the storage unit 60 stores in advance the coordinate values of the measurement start position (first measurement point) and the coordinate values of the measurement end position (last measurement point) of the measurement target 3, and the distance between the measurement points that are associated with the type of the measurement target 3. Further, the storage unit 60 holds the point cloud data of the three-dimensional coordinate values supplied from the position calculating unit 56 as measurement data. Further, the storage unit 60 holds the coordinate information of each measurement point supplied from the coordinate detection unit 52.

Further, the storage unit 60 holds design data (computer-aided design (CAD) data) 61.

Further, the storage unit 60 stores shape data 62 used when the extraction region setting unit 70 described below sets the extraction region Ap for generating point cloud data. The shape data 62 will be described in detail below.

The coordinate detection unit 52 detects the position of the optical probe 20A supported by the head position detection unit 15, that is, an observation position in the horizontal direction and an observation position in the up-down direction, and the imaging direction of the optical probe 20A, on the basis of a coordinate signal output from the head position detection unit 15. Further, the coordinate detection unit 52 detects the rotational positions about the rotation axis θ and the rotation axis φ of the stage 31 on the basis of signals indicating the rotational positions output from the stage position detection unit 34.

The coordinate detection unit 52 detects coordinate information from the information of the detected observation positions in the horizontal direction and vertical direction, and the information indicating the rotational positions (rotational position information of the stage 31) output from the stage position detection unit 34. Then, the coordinate detection unit 52 supplies the coordinate information and imaging direction of the optical probe 20A and the rotational position information of the stage 31 to the position calculating unit 56. Further, the coordinate detection unit 52 detects information such as relative movement paths of the optical probe 20A and the stage 31, a movement speed, and whether or not movement has stopped on the basis of the coordinate information and imaging direction of the optical probe 20A and the rotational position information of the stage 31, and supplies the detected information to the movement command unit 55.

The distance adjusting unit 53 reads data that specifies a sampling frequency from the storage unit 60 before the start of coordinate measurement. The distance adjusting unit 53 receives image information from the imaging unit 22 at the sampling frequency.

The drive control unit 54 outputs a driving signal to the head driving unit 14 and drives and controls the measurement head 13, on the basis of a command signal from the movement command unit 55. Further, the drive control unit 54 includes a movement control unit 54A, and a speed control unit 54B.

The movement control unit 54A controls the stage driving unit 33 so that the measurement target 3 relatively rotates in the movement direction DR3 of the detection unit 20 established in accordance with the circumferential direction of the measurement target 3, thereby moving the position to be irradiated with the measurement beam La. The movement control unit 54A of this embodiment, for example, controls the stage driving unit 33 so that the gear serving as the measurement target 3 rotates in the movement direction DR3 (that is, the circumferential direction of the gear) established so as to match the circumferential direction of the gear, thereby moving the position to be irradiated with the measurement beam La.

That is, on the basis of the control of the movement control unit 54A, the stage driving unit 33 relatively rotates the gear in the movement direction DR3 of the detection unit 20, relatively moving the position to be irradiated with the measurement beam La in the movement direction DR3 of the detection unit 20. Thus, the shape measuring apparatus 100 of this embodiment sequentially irradiates, with the measurement beam La, the uneven shape (a tooth of a gear or a turbine blade serving as the measurement target 3, for example) cyclically arranged in the circumferential direction of the measurement target 3 and extending in a direction different from the circumferential direction, and measures the surface shape of the measurement target 3. That is, the shape measuring apparatus 100 includes a movement mechanism that relatively moves the projecting unit 21 or the imaging unit 22 with the measurement target 3 so that the position of the measurement region of the measurement target 3 changes.

The speed control unit 54B controls the movement speed at which the measurement target 3 is relatively rotated, in accordance with a position in a stage radius direction of the rotational movement of the measurement target 3 irradiated with the measurement beam La.

The position calculating unit 56 calculates the shape data, that is, the three-dimensional shape data, of the surface of the measurement target 3, on the basis of the shape of the surface of the measurement target 3 detected by the optical probe 20A. That is, the position calculating unit 56 measures the shape of the surface on the basis of the position where the measurement beam La is detected on the imaging surface of the imaging unit 22, from a capture image from the imaging unit 22.

Additionally, the position calculating unit 56 receives image information made of frames supplied from the distance adjusting unit 53. The position calculating unit 56 receives the coordinate information and the imaging direction of the optical probe 20A, and the rotational position information of the stage 31, supplied from the coordinate detection unit 52.

It should be noted that the position calculating unit 56 includes the point cloud data generating unit 56A, and this point cloud data generating unit 56A calculates the point cloud data of the coordinate values (three-dimensional coordinate values) of each measurement point on the basis of the image information supplied from the distance adjusting unit 53, the coordinate information and the imaging direction of the optical probe 20A, and the rotational position information of the stage 31.

Here, for example, when the shape of the tooth serving as the measurement target 3 is measured, the position calculating unit 56 measures the shape of the tooth on the basis of the position of the measurement beam La of the image captured in a capture image from the imaging unit 22.

The specific calculation method is as follows. First, the position calculating unit 56 acquires a relative position where a line pattern indicated by the shadow pattern is projected, from the image information captured by the imaging unit 22. This relative position is a position where the line pattern of the measurement target 3 is projected with respect to the detection unit 20. Further, the relative position is calculated by the position calculating unit 56 on the basis of the imaging direction of the imaging unit 22, the projection direction of the projecting unit 21, and the distance between the imaging unit 22 and the projecting unit 21. Meanwhile, the coordinates of the position where the line pattern is projected in a reference coordinate system are calculated on the basis of the received coordinates of the optical probe 20A and the position on the image data in which the line pattern is captured.

Here, the projecting unit 21 is fixed to the optical probe 20A, and thus an irradiation angle of the projecting unit 21 is fixed with respect to the optical probe 20A. Further, the imaging unit 22 is also fixed to the optical probe 20A, and thus an imaging angle of the imaging unit 22 is fixed with respect to the optical probe 20A.

The position calculating unit 56 uses the principle of triangulation to calculate the coordinates of the position where the measurement target 3 is irradiated with the irradiating light, for each pixel of the capture image. Here, the coordinates of a point where the measurement target 3 is irradiated with the irradiating light are the coordinates of a point where a line drawn from the coordinates of the projecting unit 21 at the irradiation angle of the projecting unit 21 and a line (optical axis) drawn from the coordinates of the imaging unit 22 at the imaging angle of the imaging unit 22 intersect. It should be noted that the above-described capture image represents an image detected by the optical probe 20A disposed in a measurement position.

Thus, the position calculating unit 56 measures the shape of the surface on the basis of the position of the measurement beam La of the image captured in the capture image from the imaging unit 22.

Further, the measurement target 3 is supported by the stage 31. The measurement target 3 rotates along with the stage 31 about the rotation axis θ by the rotation of the stage 31 about the rotation axis θ, by the support table 32. Further, the measurement target 3 rotates along with the stage 31 about the rotation axis φ of the stage 31 by the rotation of the stage 31 about the rotation axis φ. In other words, the calculated coordinates of the position irradiated with the light is information indicating the position of the surface of the measurement target 3 inclined by the rotation of the stage 31 being rotated about the rotation axis θ and the rotation axis φ. Thus, the position calculating unit 56 calculates the actual surface shape data of the measurement target 3 by converting the coordinates of the position that is irradiated with the line pattern in accordance with the inclination of the stage 31, on the basis of the inclination of the stage 31, that is, the rotational position information about the rotation axis θ and the rotation axis φ.

Further, the position calculating unit 56 stores the point cloud data of the three-dimensional coordinate values serving as the calculated surface shape data of the measurement target 3 in the storage unit 60.

The movement command unit 55 reads, from the storage unit 60, the instruction information (that is, the type of the measurement target 3) stored by the input device 41. Further, the movement command unit 55 reads, from the storage unit 60, data indicating the coordinate values of the measurement points indicating the measurement target range of the measurement target 3 associated with the read type of the measurement target 3, the coordinate values of the measurement start position (first measurement point) and the measurement end position (last measurement point) of the measurement target 3, the movement direction of the measurement point, and the distance between measurement points (a measurement pitch of a constant distance, for example), and the like. The movement command unit 55 calculates the movement path of the scanning with respect to the measurement target 3, on the basis of the read data described above. Then, the movement command unit 55 supplies a command signal for driving the measurement head 13 and the stage 31 in accordance with the calculated movement path, the distance between the measurement points (the measurement pitch of a constant distance, for example) read from the storage unit 60, and the like, and causes the head driving unit 14 and the stage driving unit 33 (moving unit) to drive the measurement head 13 and stage 31.

For example, the movement command unit 55 supplies a command signal for controlling the start or stop of the movement of the measurement head 13, and the start or stop of the rotation of the stage 31; thus, the relative position of the optical probe 20A with respect to the stage 31 is moved to each measurement point. Additionally, the movement command unit 55 supplies this command signal to the distance adjusting unit 53.

The data output unit 57 reads the measurement data (coordinate values of all measurement points) and the like from the storage unit 60. The data output unit 57 supplies the measurement data and the like to the display device 45.

Further, the data output unit 57 supplies an icon used when setting the extraction region Ap described below, image data representing the shape of the extraction region Ap, and the like to the display device 45, in accordance with an instruction from the extraction region setting unit 70. Further, the data output unit 57 outputs the measurement data and the like to a printer, a design system (not illustrated) such as a CAD system.

The extraction region setting unit 70 allows the extraction region Ap to be set on the basis of an image having at least, among a plurality of capture images of different measurement regions captured by the imaging unit 22, a capture image captured when the image of the pattern is positioned on the outermost side of the measurement target 3. The point cloud data generating unit 56A within the position calculating unit 56 calculates the point cloud data of the coordinate values of the measurement target 3 on the basis of the image information within the extraction region Ap set by this extraction region setting unit 70. In other words, the position calculating unit 56, after acquiring a plurality of image data, calculates the position of the measurement target 3 on the basis of a capture image within the extraction region Ap set by the extraction region setting unit 70, the capture image being among the image data acquired by the imaging unit 22. The configuration and operation of the extraction region setting unit 70 will be described in detail below.

Next, each of the irradiation direction DR1, the imaging direction DR2, and the movement direction DR3 in a case where the shape measuring apparatus 100 of this embodiment measures the shape of a gear serving as the measurement target 3 will be described using a case in which the spiral bevel gear SBG is measured.

Measurement of Spiral Bevel Gear SBG

Figure 5:
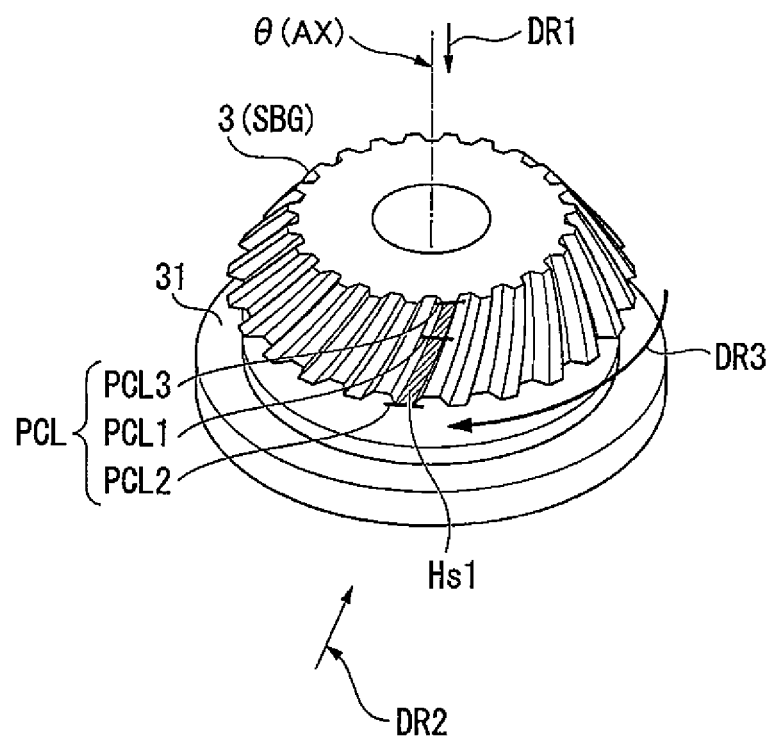
FIG. 5 is a view illustrating an example of a measurement target measured by the shape measuring apparatus of the embodiment.

The shape measuring apparatus 100 of this embodiment is capable of measuring the shape of the measurement target 3, with the spiral bevel gear SBG set as the measurement target 3, as illustrated in FIG. 5, for example.

FIG. 5 is a view illustrating an example of the measurement target 3 measured by the shape measuring apparatus 100 of this embodiment. When the shape measuring apparatus 100 measures the shape of the spiral bevel gear SBG, the spiral bevel gear SBG serving as the measurement target 3 is placed on the stage 31 with the center of the rotation axis of the spiral bevel gear SBG and the center of the rotation axis θ of the stage 31 aligned with each other, for example. The stage driving unit 33 rotationally drives the spiral bevel gear SBG with the rotation axis of the spiral bevel gear SBG placed on the stage 31 and the rotation axis of the rotational movement of the stage 31 aligned with each other.

Further, the projecting unit 21 irradiates, with the measurement beam La, the tooth surface Hs1 of the spiral bevel gear SBG in the irradiation direction DR1 established in accordance with the normal direction of the tooth surface Hs1 of the spiral bevel gear SBG. Assuming an envelope surface of a top portion of each tooth, the normal direction of the tooth surface Hs1 refers to a direction perpendicular to the envelope surface in the measurement region.

The imaging unit 22 captures the measurement beam La from the imaging direction DR2 established in accordance with the direction (different from the circumferential direction) of the tooth trace of the tooth surface (surface) of the spiral bevel gear SBG irradiated with the measurement beam La. In other words, the imaging unit 22 sets the direction of tooth trace of the spiral bevel gear SBG, that is, the Z-axis direction, as the imaging direction DR2, and captures the light-section line PCL, as illustrated in FIG. 5. The shape measuring apparatus 100 measures the shape of one tooth of the spiral bevel gear SBG by moving the position of the light-section line PCL along the tooth trace.

More specifically, the shape measuring apparatus 100 moves the projecting unit 21 and the imaging unit 22 in the direction of the tooth trace of the spiral bevel gear SBG, thereby moving the measurement region so that each position of the tooth surface Hs1 is in the measurement region. Here, the movement direction is not limited as long as the measurement region is moved in the tooth trace direction. For example, the measurement region may be moved from the outer peripheral side to the inner peripheral side, or from the inner peripheral side to the outer peripheral side. Here, a case where the measurement region is moved from the outer peripheral side to the inner peripheral side of the spiral bevel gear SBG will be described as an example.

Figure 6:
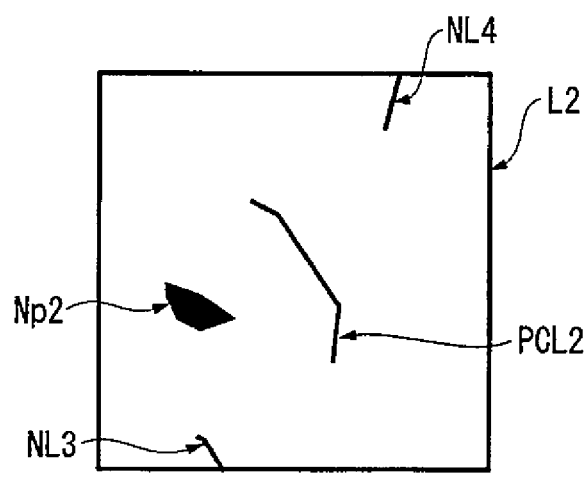
FIG. 6 is a schematic view illustrating an example of a capture image on an outer peripheral side of a tooth trace of the embodiment.

The shape measuring apparatus 100, as illustrated in FIG. 6, moves the projecting unit 21 and the imaging unit 22 so that a light-section line PCL2 occurs in a position on the outer peripheral side of the spiral bevel gear SBG, and captures the image of the light-section line PCL2.

FIG. 6 is a schematic view illustrating an example of a capture image L2 of the outer peripheral side of the tooth trace of this embodiment. As illustrated in FIG. 6, the imaging unit 22 captures the capture image L2, which is an image of the measurement region on the outer peripheral side of the tooth trace of the spiral bevel gear SBG. This capture image L2 includes an image of the light-section line PCL2 to be measured, as well as a multiple reflected light image (noise Np2) and images of adjacent tooth surfaces (noise NL3, noise NL4), which are abnormal points.

That is, in this capture image L2, the region that includes the image of the light-section line PCL2 and not the multiple reflected light image (noise Np2) or the images of adjacent tooth surfaces (noise NL3, noise NL4) is a region to be set as the extraction region.

Here, the capture image L2 is an example of an image having at least, among a plurality of capture images of different measurement regions captured by the imaging unit 22, a capture image captured when the image of the pattern is positioned on the outermost side of the set measurement target range of the measurement target 3.

Further, the shape measuring apparatus 100 moves the projecting unit 21 and the imaging unit 22 so that a light-section line PCL1 occurs in a position (a center position of the tooth trace, for example) on the innermost peripheral side of the tooth trace with respect to this light-section line PCL2, and captures the light-section line PCL1.

Figure 7:
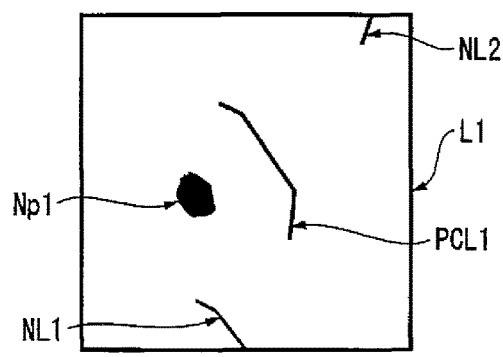
FIG. 7 is a schematic view illustrating an example of a capture image of a middle section of the tooth trace of the embodiment.

FIG. 7 is a schematic view illustrating an example of the capture image L1 of a middle section of the tooth trace of this embodiment. As illustrated in FIG. 7, the imaging unit 22 captures the capture image L1, which is an image of the measurement region in the middle section of the tooth trace of the spiral bevel gear SBG. This capture image L1 includes the image of the light-section line PCL1 to be measured, as well as a multiple reflected light image (noise Np1) and images of adjacent tooth surfaces (noise NL1, noise NL2), which are abnormal points. That is, in this capture image L1, the region that includes the image of the light-section line PCL1 and not the multiple reflected light image (noise Np1) or the images of adjacent tooth surfaces (noise NL1, noise NL2) is a region to be set as the extraction region.

Further, the shape measuring apparatus 100 moves the projecting unit 21 and the imaging unit 22 so that a light-section line PCL3 occurs in a position on the inner peripheral side of this light-section line PCL1, and captures the light-section line PCL3.

Figure 8:
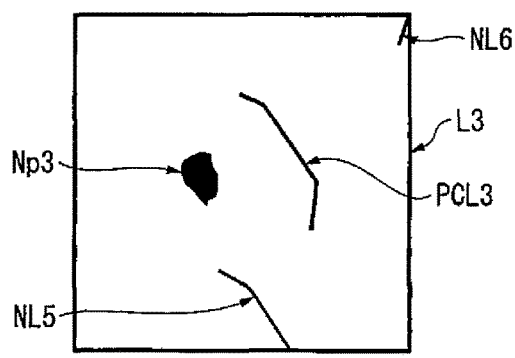
FIG. 8 is a schematic view illustrating an example of a capture image on an inner peripheral side of the tooth trace of the embodiment.

FIG. 8 is a schematic view illustrating an example of a capture image L3 on the inner peripheral side of the tooth trace of this embodiment. As illustrated in FIG. 8, the imaging unit 22 captures the capture image L3, which is an image of the measurement region on the inner peripheral side of the tooth trace of the spiral bevel gear SBG. This capture image L3 includes the image of the light-section line PCL3 to be measured, as well as a multiple reflected light image (noise Np3) and images of adjacent tooth surfaces (noise NL5, noise NL6), which are abnormal points. That is, in this capture image L3, the region that includes the image of the light-section line PCL3 and not the multiple reflected light image (noise Np3) or the images of adjacent tooth surfaces (noise NL5, noise NL6) is a region to be set as the extraction region. Thus, the shape measuring apparatus 100 captures the images for one tooth of the tooth surface Hs1 by sequentially capturing images of the light-section line PCL while moving the position of the light-section line PCL along the tooth trace of the gear to be measured. Next, a configuration for setting the extraction region on the basis of a composite image (logical sum image) of capture images will be described with reference to FIG. 9 and FIG. 10.

Figure 9:
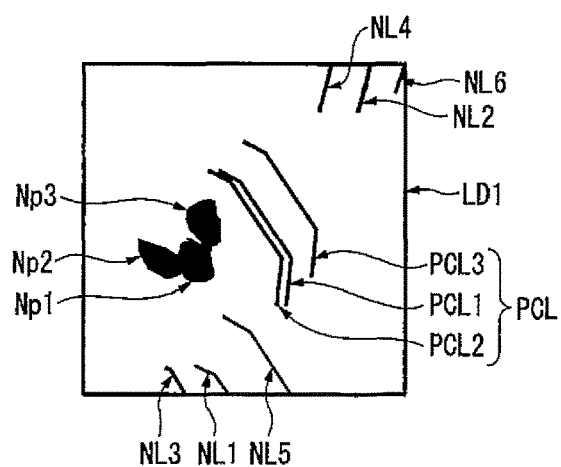
FIG. 9 is a schematic view illustrating an example of a logical sum image generated by a logical sum image generating unit of the embodiment.

FIG. 9 is a schematic view illustrating an example of a logical sum image generated by a logical sum image generating unit 76 of this embodiment. The logical sum image generating unit 76 generates the logical sum image from image data of different measurement regions captured by the imaging unit 22. Specifically, the logical sum image generating unit 76 compares pixel values of an identical pixel position in the capture images L1 to L3 described with reference to FIGS. 6 to 8, and sets the pixel value having the highest value or median value as the pixel value of that pixel position. The logical sum image generating unit 76 performs such processing, and generates a composite logical sum image LD1 by taking the logical sum of the pixel values. The logical sum image LD1 includes the images of the light-section lines PCL1 to PCL3, and the multiple reflected light images (noises NP1 to NP3) included in the capture images L1 to L3, and images of adjacent tooth surfaces (noises NL1 to NL6) It should be noted that applicable methods for generating the logical sum image include the following. For example, the logical sum image generating unit 76 further includes image binarization processing. This image binarization processing unit converts each of the capture images L1 to L3 into a binary image using a predetermined pixel value as a threshold value. Then, the logical sum image generating unit 76 compares the pixel values of an identical pixel position. Then, if any pixel having a high pixel value, or a pixel value is "1", is present in any of the binary images, the pixel value of the pixel is set to 1.Thus, the logical sum image generating unit 76 generates a logical sum image.

Figure 10:
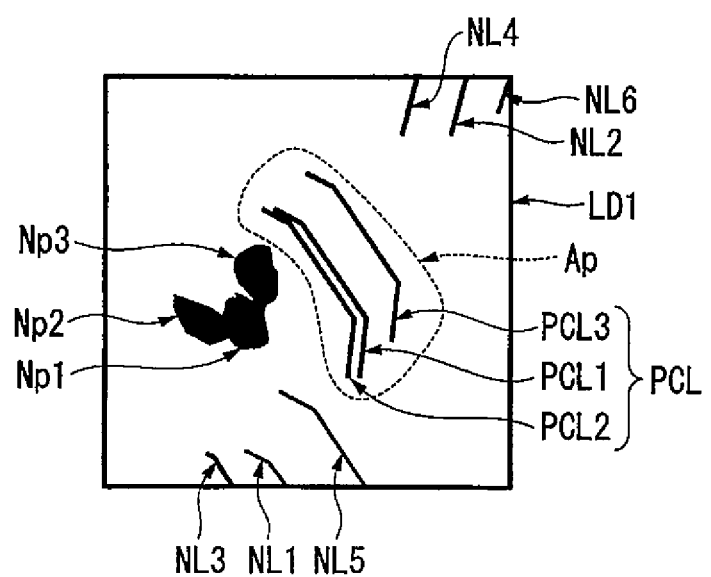
FIG. 10 is a schematic view illustrating an example of an extraction region that can be set by an extraction region setting unit of the embodiment.

FIG. 10 is a schematic view illustrating an example of an extraction region that can be set by the extraction region setting unit 70 of this embodiment. The extraction region setting unit 70 allows the extraction region Ap to be set on the basis of an image of at least the light-section line PCL positioned on the outermost side of the measurement target 3 among the images of the light-section lines PCL1 to PCL3 included in the logical sum image LD1 generated by the logical sum image generating unit 76. Here, in the aforementioned specific example, the light-section line PCL positioned on the outermost side of the measurement target 3 corresponds to the light-section line PCL2 positioned on the outermost peripheral side of the tooth trace of the spiral bevel gear SBG, and the light-section line PCL3 positioned on the innermost peripheral side of the tooth trace of the spiral bevel gear SBG. In this example, the extraction region setting unit 70 allows the extraction region Ap to be set on the basis of the logical sum image LD1 that includes the capture image L2, which includes the image of the light-section line PCL2, and the capture image L3, which includes the image of the light-section line PCL3. Specifically, the extraction region setting unit 70 allows a region that includes at least the image of the light-section line PCL2 and the image of the light-section line PCL3, and not the multiple reflected light images (noises Np1 to Np3) or the images of adjacent tooth surfaces (noises NL1 to NL6), within the logical sum image LD1 to be set as the extraction region Ap. That is, the extraction region setting unit 70 allows the extraction region Ap to be set on the basis of an image having at least, among a plurality of capture images of different measurement regions captured by the imaging unit 22, a capture image captured when the image of the pattern is positioned on the outermost side of the measurement target 3.

The following describes a specific example in which the extraction region setting unit 70 allows an extraction region to be set. The extraction region setting unit 70 outputs the logical sum image LD1 to the display device 45 via the data output unit 57 (refer to FIG. 4). Accordingly, the logical sum image LD1 is displayed on the display screen 46 of the display device 45. In other words, the display device 45 displays the logical sum image LD1 generated by the logical sum image generating unit 76. Here, the logical sum image LD1 is an example of a plurality of capture images of different measurement regions captured by the imaging unit 22. That is, the display device 45 displays a plurality of capture images of different measurement regions captured by the imaging unit 22 on the same screen.

The user sets the extraction region Ap with respect to the logical sum image LD1 displayed on the display screen 46. For example, the user inputs a contour line (the dashed line in FIG. 10, for example) of the extraction region Ap using the mouse 42 included in the input device 41 so as to include the image of the light-section line PCL2 and the image of the light-section line PCL3, while viewing the logical sum image LD1 displayed on the display screen 46. That is, information indicating the extraction region Ap with respect to the logical sum image LD1 displayed by the display device 45 is input to the input device 41. The extraction region setting unit may recognize a locus of the mouse displayed on the display screen 46 as position information of the contour of the extraction region, or recognize, as position information of the contour of the extraction region, a polygon shape generated by setting points plotted via the mouse or the like on the display screen 46 as vertexes and sequentially connecting each vertex. Here, the extraction region Ap is an example of information related to a selection region for selecting a portion of the capture image. In other words, information related to the extraction region Ap for selecting a portion of the capture image is input to the input device 41.

The extraction region setting unit 70 sets the extraction region Ap with respect to the capture images L1 to L3, an image having a plurality of capture images superimposed, a logical sum image, or the like, by acquiring coordinate information of the contour of the extraction region Ap input by the mouse 42 via the input device 41. That is, the extraction region setting unit 70 sets the extraction region on the basis of information indicating the extraction region input to the input device 41.

The position calculating unit 56 calculates the position of the measurement target 3 by extracting image data used for position calculation from each capture image, on the basis of the extraction region Ap thus set. In other words, the position calculating unit 56, after acquiring a plurality of image data, calculates the position of the measurement target 3 on the basis of a capture image within the extraction region set by the extraction region setting unit 70, the capture image being included in the image data acquired by the imaging unit 22.

Further, when measurement of the shape of one tooth of the tooth surface Hs1 is completed, the movement control unit 54A rotates the support table 32 by the amount of one tooth in the movement direction DR3 around the rotation axis θ to measure the shape of a tooth surface adjacent to the tooth surface Hs1. In other words, the movement control unit 54A relatively moves the position of the measurement target 3 to be irradiated with the measurement beam La in the movement direction DR3 of the detection unit 20 established in accordance with the circumferential direction. The shape measuring apparatus 100 thus measures the overall shape of the spiral bevel gear SBG.

This shape measuring apparatus 100 includes the rotary axis motor of the stage 31 for moving the position of the measurement region to be irradiated with the measurement beam La in the movement direction DR3 in accordance with the circumferential direction. With the movement of this motor, the stage rotates about the rotation axis θ. The measurement target 3 then relatively moves with respect to the projecting unit 21. Additionally, the imaging unit 22 generates a capture image every time the measurement region is displaced in the movement direction DR3, and the position calculating unit 56 measures a plurality of uneven shapes on the basis of the capture images. Further, the moving unit 10 relatively moves the projecting unit 21 with respect to the measurement target 3 so that the projecting unit 21 moves in a movement direction DR4 established in accordance with the direction in which the tooth trace extends.

Additionally, at this time, the projecting unit 21 emits the line-shaped measurement beam La so that a line (the light-section line PCL) is formed from the most convex portion to the most concave portion of the uneven shape of the measurement target 3. The irradiation direction DR1, which is the irradiation direction at this time, is set to the normal direction of the surface to be mainly measured. In other words, the projecting unit 21 irradiates, with the measurement beam La, the surface to be measured of the gear serving as the measurement target 3 so that the light-section line PCL is formed from the tooth tip portion to the tooth bottom portion of the surface.

Then, the imaging unit 22 generates a capture image of the surface of the measurement target 3. Further, the position calculating unit 56 measures the uneven shape of a region of a portion of a tooth surface on the basis of a capture image captured by the imaging unit 22. Here, the surface shape of each tooth of the gear can be measured by capturing images while sequentially changing the projection region of the line-shaped measurement beam La in the tooth trace direction of the gear. The dimension of the uneven shape (that is, the tooth of the gear) of the measurement target 3 corresponds to the direction of a tooth thickness of the gear. Additionally, a length by which the image of the measurement beam La illuminating the surface is captured is, for example, a length captured by the imaging unit 22 within the length viewed from the imaging direction DR2 of the light-section line PCL formed on the surface of the measurement target 3. That is, in a case in which the measurement target 3 is a gear, the imaging unit 22 generates a plurality of capture images captured in accordance with a length of the width of the tooth and the length by which the image of the measurement beam La illuminating the tooth surface is captured. In other words, the imaging unit 22 generates a plurality of capture images in which a plurality of teeth of the gear are captured. In this case, the position calculating unit 56 measures the shapes of the plurality of teeth on the basis of the plurality of capture images.

It should be noted that the projecting unit 21 may irradiate with the measurement beam La with a direction that intersects the circumferential direction of the measurement target 3 set as the direction of the light-section line PCL. That is, the projecting unit 21 may irradiate with the measurement beam La so that the light-section line PCL is, for example, formed on an incline from the circumferential direction of the spiral bevel gear SBG in the direction of the tooth trace. Further, in a case in which the user wants to measure either a left or right surface with respect to the tooth trace, the measurement beam La may be set nearly perpendicular to the surface of the tooth to be measured.

Description of Processing for Executing Shape Measurement

Next, the processing in which the shape measuring apparatus 100 measures the shape of the measurement target 3 will be described with reference to FIG. 11.

Here, work during a teaching process will be mainly described. In actuality, the logical sum image that combines the capture image of each measurement position selected as a measurement point is displayed on the basis of the teaching process. After the user sets the extraction region Ap with respect to this logical sum image, the main measurement is performed by continually scanning so that each measurement point is connected and measuring by smaller distance between the measurement points.

Figure 11:
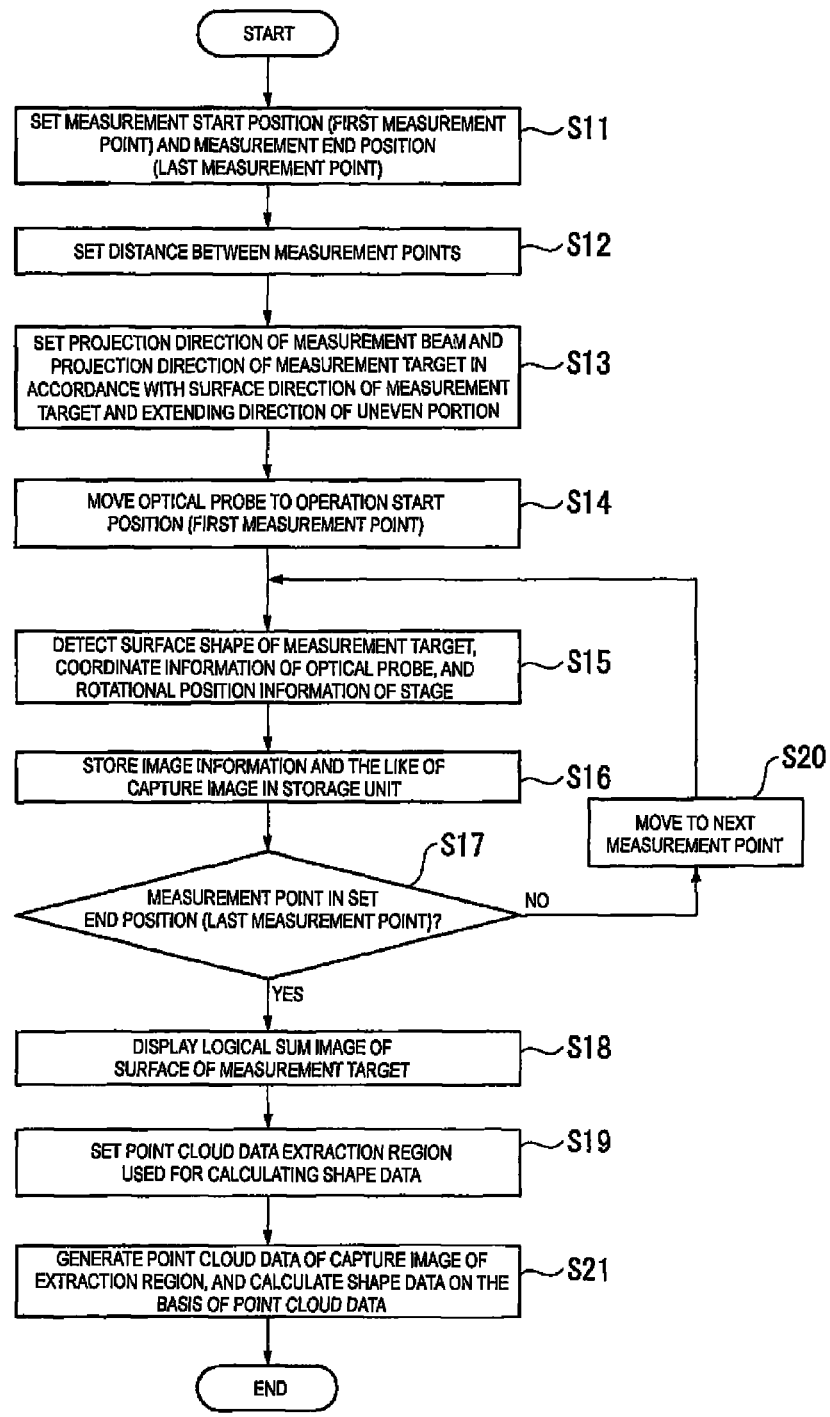
FIG. 11 is a flowchart illustrating an example of an operation of the shape measuring apparatus of the embodiment.

FIG. 11 is a flowchart illustrating an example of an operation of the shape measuring apparatus 100 of this embodiment. Initially, the user inputs and sets the measurement start position (first measurement point) and the measurement end position (last measurement point) of the measurement target 3 from the input device 41. The input device 41 stores the input measurement start position (first measurement point) and measurement end position (last measurement point) in the storage unit 60 (step S11).

Further, the user inputs and sets the distance between the measurement points of the measurement target 3 from the input device 41. The input device 41 stores the input distance between measurement points in the storage unit 60 (step S12).

Next, the projection direction and imaging direction of the measurement beam La are set on the basis of specification data of the gear at the measurement points of the measurement target 3. Specifically, the projection direction is set in accordance with the direction of the tooth surface of the gear, and the scanning direction of the detection unit 20 is set along the direction of the tooth trace of the gear (step S13).

The movement command unit 55 reads data, which is the input and set information, indicating the coordinate values of the measurement start position (first measurement point) and measurement end position (last measurement point) and the distance between measurement points (measurement pitch of a constant distance, for example), the coordinate values of a plurality of measurement points indicating the measurement target range and the movement direction of the measurement points, which are preset information, and the like, from the storage unit 60. The movement command unit 55 calculates the movement path of the scan with respect to the measurement target 3 on the basis of the read data described above.

Next, the movement command unit 55 supplies a command signal for driving the measurement head 13 and the stage 31 to the drive control unit 54 on the basis of the calculated movement path, and causes the head driving unit 14 and the stage driving unit 33 (moving unit) to drive the measurement head 13 and the stage 31. Accordingly, the movement command unit 55 moves the relative position of the measurement head 13 with respect to the stage 31, thereby moving the optical probe 20A to the measurement start position (first measurement point) of the measurement target 3 (step S14).

Next, the distance adjusting unit 53 detects the surface shape of the measurement target 3 via the optical probe 20A, and supplies the image information of the detected capture image (the capture image of the light-section line PCL) to the position calculating unit 56.

Further, the coordinate detection unit 52 detects the coordinate information of the optical probe 20A and the rotational position information of the stage 31 from the position detection unit 17, and supplies the detected information to the position calculating unit 56 (step S15).

The position calculating unit 56 stores, in the storage unit 60, the image information of the capture image (the capture image of the light-section line PCL) supplied from the distance adjusting unit 53 along with the coordinate information of the optical probe 20A and the rotational position information of the stage 31 supplied from the coordinate detection unit 52 (step S16).

Next, the movement command unit 55 determines whether or not the measurement point just measured is the measurement end position (last measurement point) (step S17).

When the measurement point just measured is determined to not be the measurement end position (last measurement point) (a measurement point other than the measurement end position) in step S17 (No in step S17), the movement command unit 55 moves the optical probe 20A to the next measurement point, and then stops the optical probe 20A. For example, to move the optical probe 20A to the next measurement point along the movement path, the movement command unit 55 supplies, to the drive control unit 54, a command signal for driving the measurement head 13 and the stage 31, and causes the head driving unit 14 and the stage driving unit 33 to drive the measurement head 13 and stage 31 (step S20). Then, the movement command unit 55 returns control to step S15.

Alternatively, when the measurement point just measured is determined to be the measurement end position (last measurement point) in step S17 (Yes in step S17), the logical sum image generating unit 76 generates the logical sum image LD1 from all capture images stored in the storage unit 60, and displays the generated logical sum image LD1 on the display screen 46 of the display device 45 (step S18).

Next, the extraction region setting unit 70 sets the extraction region Ap of the image to be used for calculating the three-dimensional shape data of the measurement target 3 (step S19). The region set in step S18 is associated with the coordinate information of the optical probe 20A and the rotational position information of the stage 31 from the position detection unit 17, which are acquired in step S15, and is stored in the storage unit 60.

Then, on the basis of the set extraction region Ap, the relative position information of the detection unit 20 with respect to the position on the measurement target 3 onto which the measurement beam La is projected is calculated, and the point cloud data is generated. The point cloud data generating unit 56A in the position calculating unit 56 reads, from the storage unit 60, the image information within the extraction region Ap detected by the optical probe 20A, and the coordinate information of the optical probe 20A and the rotational position information of the stage 31 detected by the coordinate detection unit 52, and generates the point cloud data of the capture image within the extraction region Ap, on the basis of the read information. Further, the position calculating unit 56 calculates the three-dimensional shape data of the measurement target 3 on the basis of the point cloud data within the extraction region Ap generated by the point cloud data generating unit 56A (step S21).

Thus, the three-dimensional shape data in the teaching process is output, and the user determines whether or not the data is acceptable. On the basis of the result, the flow proceeds to the main measurement.

As described above, the shape measuring apparatus 100 of this embodiment allows the extraction region Ap of the point cloud data in the capture image to be set on the basis of the logical sum image LD1, and calculates the three-dimensional shape data of the measurement target 3 on the basis of the point cloud data within the set extraction region Ap. Thus, in the shape measuring apparatus 100, it is possible to collectively set the extraction region Ap for a plurality of capture images. As a result, in the shape measuring apparatus 100, it is possible to decrease the time required to set the extraction region Ap for a plurality of capture images compared to a case in which the extraction region Ap is set for each of the plurality of capture images. Further, in the shape measuring apparatus 100, it is possible to set the range of the extraction region Ap from an image having at least a capture image captured when the image of the pattern is positioned on the outermost side of the measurement target 3. In other words, in the shape measuring apparatus 100, it is possible to set the range of the extraction region Ap on the basis of capture images in which the positions of both ends of the measurement target 3 are captured, among a plurality of capture images. Here, the positions of abnormal points within a capture image of a position other than the positions of both ends of the measurement target 3 may be found on the basis of positions of abnormal points within the capture images of both ends of the measurement target 3. In such a case, in the shape measuring apparatus 100, as long as the extraction region Ap is set on the basis of the capture images of both ends of the measurement target 3, it is possible to decrease the abnormal points included within the range of the extraction region Ap even when the extraction region Ap is collectively set for a plurality of capture images.

As a result, in the shape measuring apparatus 100, it is possible to properly omit abnormal points and generate point cloud data even when the extraction region Ap is collectively set for a plurality of capture images.

[Second Embodiment]

In the aforementioned first embodiment, the extraction region Ap is set by the user. In contrast, in this embodiment, an extraction region setting unit 70A sets the extraction region Ap without any user operation.

Figure 12:
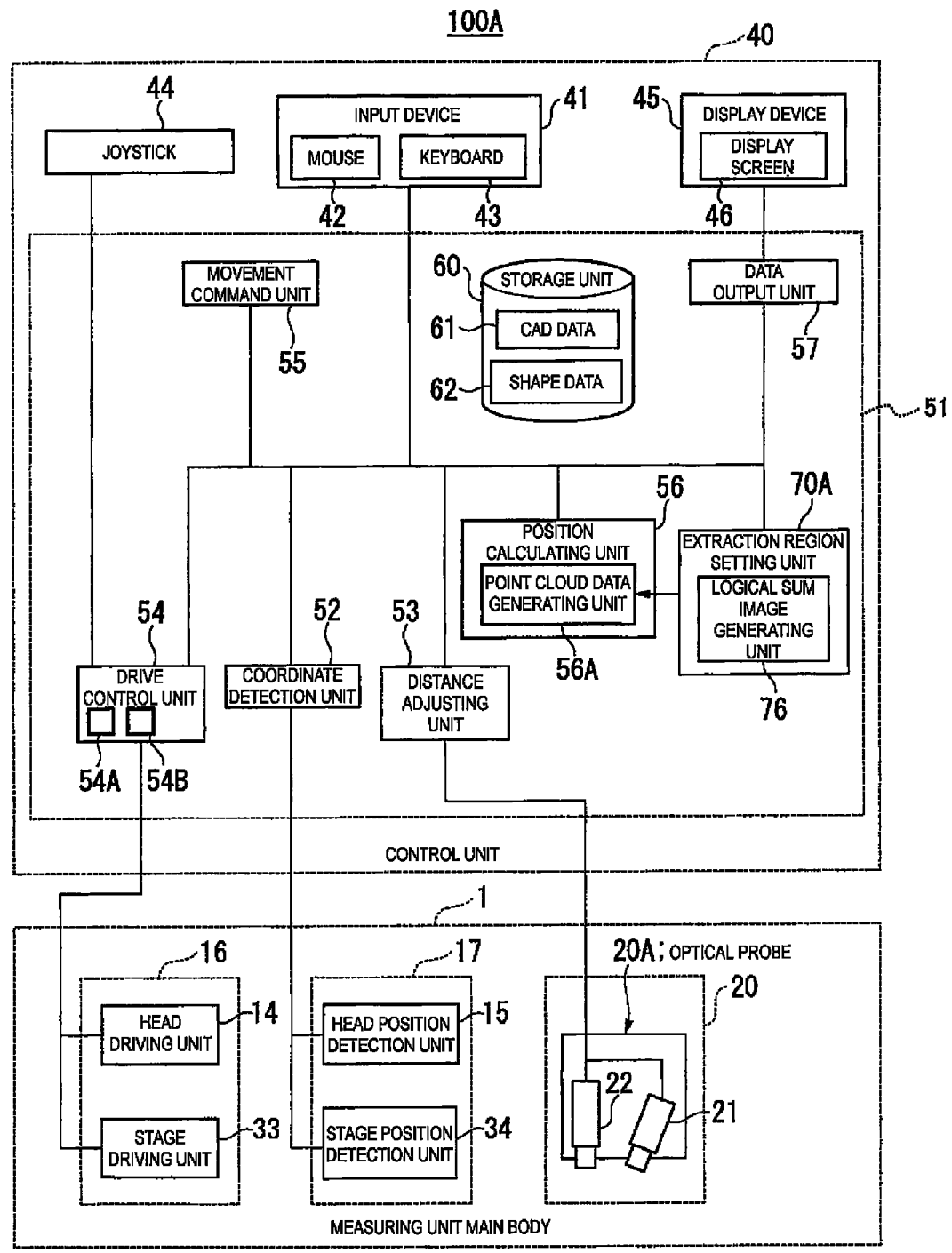
FIG. 12 is a block diagram illustrating a configuration of a shape measuring apparatus according to a second embodiment of the present invention.

FIG. 12 is a block diagram illustrating a configuration of a shape measuring apparatus 100A according to a second embodiment of the present teaching. Compared to the configuration of the shape measuring apparatus 100 of the first embodiment illustrated in FIG. 4, the shape measuring apparatus 100A illustrated in FIG. 12 differs in that the extraction region setting unit 70A illustrated in FIG. 12 replaces the extraction region setting unit 70 illustrated in FIG. 4. All other components are the same as those of the shape measuring apparatus 100 illustrated in FIG. 4. Thus, the same components are denoted by the same reference numbers, and duplicate descriptions are omitted.

Figure 15:
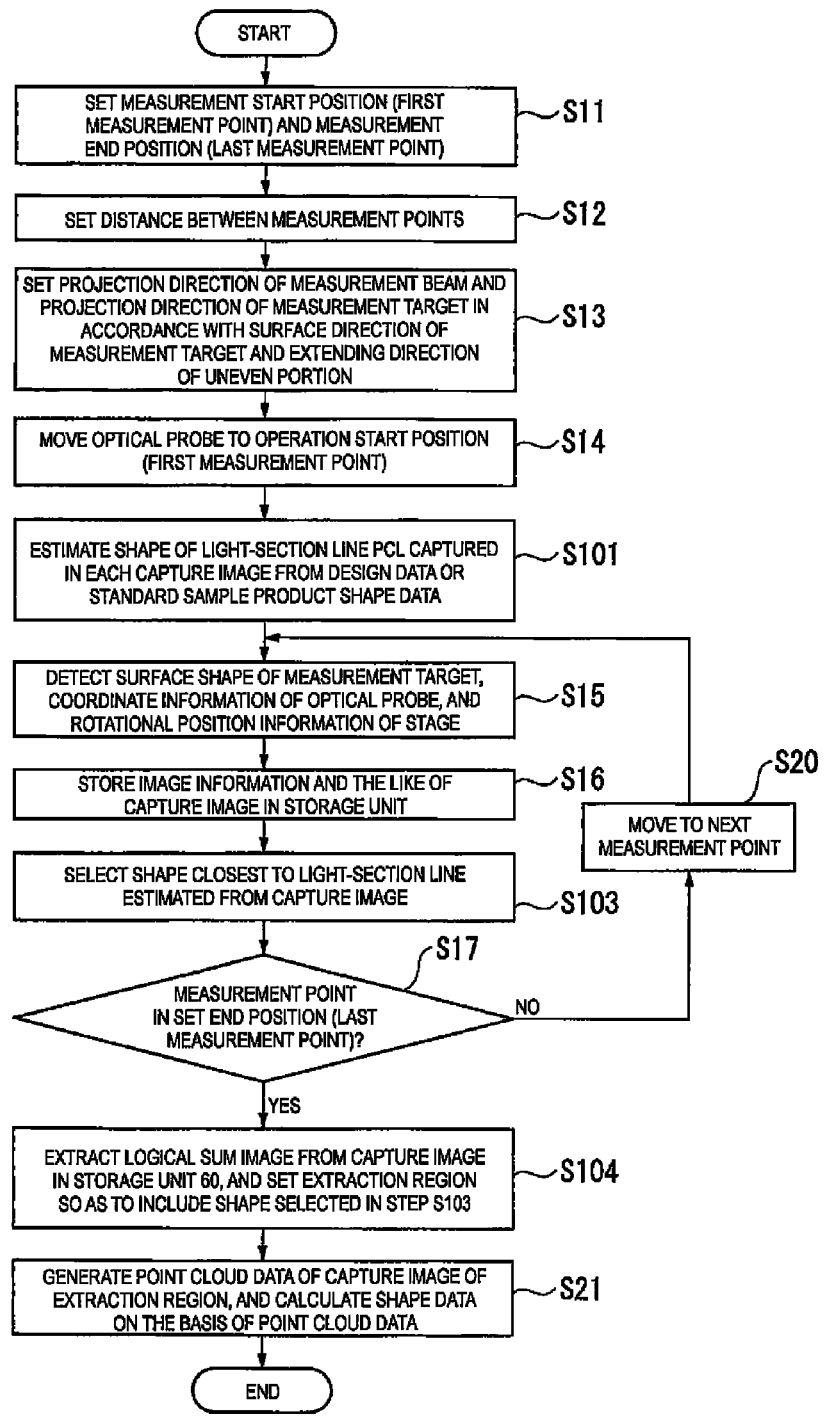
FIG. 15 is a flowchart illustrating an example of an operation of the shape measuring apparatus of the second embodiment.

The extraction region setting unit 70A determines a region that includes abnormal points such as a multiple reflected light image (noise N1) and the like, and sets a normal region that excludes the abnormal points as an extraction region Ap, on the basis of a capture image of a light-section line PCL on a measurement target 3 captured by an imaging unit 22. A description will be given along with the flow of FIG. 15. It should be noted that, step numbers S11 to S21 have the same content as those described in FIG. 11, and individual descriptions thereof will be omitted. The newly added steps are as follows. First, after step S14, a step of estimating the shape of the light-section line PCL is provided as step S101. Specifically, the shape of the light-section line PCL captured in each capture image is estimated from design data and shape data of standard sample product shape data already acquired, on the basis of the projection direction and the imaging direction set in step S13. Naturally, the shape of the light-section line PCL may be set using an image of the light-section line PCL acquired when the standard sample product is measured using this measuring apparatus. After the execution of step S15 and step S16, a step of selecting an image closest in shape from the capture images, on the basis of the shape of the light-section line PCL estimated in step S101. The details are as follows. The execution of step S15 and step S16 causes each capture image to be stored in the storage unit 60. Next, an image closest in shape to the estimated light-section line is selected from the capture images (step S103).

At this time, image selection is achieved by using a known pattern matching technique. When the known pattern matching technique is applied, it is best to execute the following processing. First, a contour of an image appearing in the capture images stored in the storage unit 60 is extracted. For example, the contour is extracted by binarizing the image data, detecting an edge between a light portion and dark portion of each image, and establishing the edge as the contour, or on the basis of a luminosity difference or brightness difference between adjacent pixels. On the other hand, the contour is extracted in the same manner as the image of the estimated light-section line PCL. The image having the highest similarity is extracted from the capture images on the basis of the position information of the contour acquired from the capture images and the position information of the contour of estimated image. Similarity is evaluated using a method in which a score changes as the contour pixel positions come closer to each other. Such a score, for example, is referred to as a degree of similarity. An image having a degree of similarity equal to or greater than a threshold value is specified as the image of the light-section line PCL. Specifically, the technique disclosed in Japanese Unexamined Patent Application Publication No. 2009-68998A or the like may be used.

Next, for each of the capture images, a capture image in which only the specified image is left and all other images are removed is generated and stored in the storage unit 60 as an image for generating a logical sum image.

Next, the images for generating a logical sum image in which images selected from the capture images remain and all other images are removed are read from the storage unit 60 and used to generate a logical sum image in step S18. Then, an extraction region is set so as to include at least, among the image data constituting the logical sum image, the image closest in shape to the estimated light-section line selected in step S103.

Thus, the extraction region setting unit 70A sets the extraction region on the basis of an image having at least, among a plurality of capture images of different measurement regions captured by the imaging unit 22, a capture image captured when the image of the measurement beam is positioned on the outermost side.

More specifically, the extraction region setting unit 70A, for example, sets an extraction region on the basis of image objects transferred to the logical sum image so that the extraction region includes an image closest in shape to the estimated light-section line selected in step S103 and not include the other images. In particular, an image having a pattern that can be determined to be a multiple reflected light image (noise Np1) on the basis of the capture images is determined to be an abnormal point (noise Np1).

Then, the extraction region setting unit 70A sets a region (region surrounded by the dashed line in FIG. 10, for example) that does not include the multiple reflected light image (noise Np1) as the extraction region Ap for generating point cloud data (step S104).

As described above, in the shape measuring apparatus 100A of the second embodiment, it is possible to automatically set the extraction region for generating point cloud data without any user operation, on the basis of capture images of the measurement target 3.

The automatic setting of the extraction region is not limited to the above. For example, the extraction region may be set by selecting the shape closest to the estimated light-section line from the capture images, setting an image center point IC at a position common to the capture images and, selecting the image of the light-section line having the smallest value and the image of the light-section line having the largest value in each direction as the selected light-section line images when a preset direction from the image center point IC is set as positive (and the opposite direction is set as negative).

Examples of that are illustrated in FIGS. 16A, 16B, and 16C. FIG. 16A is an example of when distances from the image center point IC are revealed in each of the directions L1P1 to L1P3 on the basis of the capture image in FIG. 6, FIG. 16B is an example of when the distances from the image center point IC are revealed in each of the directions L1P2 to L3P2 on the basis of the capture image in FIG. 7, and FIG. 16C is an example of when the distances from the image center point IC are revealed in each of the directions L1P3 to L3P3 on the basis of the capture image in FIG. 8. Here, the directions L1P1, L2P1, and L3P1 indicate distance data in the directions L1P1, L2P1, and L3P1 in the image of FIG. 6. Additionally, the directions L1P2, L2P2, and L3P2 indicate distance data in the directions L1P2, L2P2, and L3P2 in the image of FIG. 7. Further, the directions L1P3, L2P3, and L3P3 indicate distance data in the directions L1P3, L2P3, and L3P3 in the image of FIG. 8.

In this example, the directions are as follows. Direction L1P1<Direction L1P2<Direction L1P3, Direction L2P1<Direction L2P2<Direction L2P3, and Direction L3P1<Direction L3P2<Direction L3P3. Thus, P1 has the smallest value in each direction. Additionally, P3 has the largest value in each direction. Thus, using each of the captured images, the captured images indicating the maximum distance and minimum distance in each of the directions L1 to L3 may be extracted, and the extraction region may be set from two images (the images in FIG. 16A and FIG. 16C in this example), which are extracted captured images. It should be noted that, in this example, the directions indicated by the arrows correspond to positive values, and the directions opposite the arrows correspond to negative values.

Additionally, there are cases where a portion of the image closest in shape to the estimated light-section line in each arrow (or inversely oriented arrow) direction is not positioned in all captured images. In this case, preferably the image center point IC direction is changed and a direction corresponding to each of the captured images is selected.

It should be noted that the extraction region setting unit 70A may include the logical sum image generating unit 76 that acquires a logical sum image from the extracted images of different measurement regions captured by the imaging unit 22. In this case, the extraction region setting unit 70A sets the extraction region Ap of the capture images generated by the imaging unit 22 from the logical sum image. With such a configuration, the shape measuring apparatus 100A can set the extraction region Ap on the basis of a logical sum image, making it possible to decrease the number of abnormal points included within the range of the extraction region Ap.

Further, in the aforementioned case, the logical sum image generating unit 76 may be configured to generate a logical sum image that includes at least one capture image acquired by the imaging unit 22 when the measurement region is in a position on an end portion of the measurement target range of the measurement target 3.

Here, the capture image acquired by the imaging unit 22 in the position on an end portion of the measurement target range may readily reveals the characteristics of the positions of abnormal points within the capture image compared to a capture image acquired by the imaging unit 22 in a position other than an end portion of the measurement target range. Accordingly, in such a case, the positions of the abnormal points within the capture image are readily identified. Therefore, with such a configuration, the extraction region Ap can be set on the basis of an image in which the characteristics of the positions of the abnormal points within the capture image are well revealed, making it possible to decrease the number of abnormal points included within the range of the extraction region Ap.

Further, in the aforementioned case, the logical sum image generating unit 76 may be configured to generate a logical sum image representing a logical sum of capture images on the basis of at least two capture images in which images of at least two measurement regions among a plurality of measurement regions of the measurement target 3 are captured. With such a configuration, it may become easier to identify the characteristics of the positions of abnormal points within capture images when there are a plurality of capture images, compared to when there is one capture image. Accordingly, such a configuration allows the extraction region Ap to be set with the characteristics of the positions of the abnormal points within the capture image readily identified, making it possible to decrease the number of abnormal points included within the range of the extraction region Ap.

Further, the extraction region setting unit 70 (or the extraction region setting unit 70A) may be configured to set at least two extraction regions differing in shape from each other in at least two measurement regions of the plurality of measurement regions of the measurement target 3. According to such a configuration as well, the extraction region Ap can be set while readily identifying the characteristics of the positions of the abnormal points within the capture images, making it possible to decrease the number of abnormal points included within the range of the extraction region Ap.

Further, the extraction region setting unit 70 (or the extraction region setting unit 70A) may be configured to set the extraction region within the capture images generated by the imaging unit 22 on the basis of a logical sum image, which is an image in which the amount of information for the capture images generated by the imaging unit 22 has been decreased. It should be noted that the logical sum image refers to an image in which the amount of information for the capture images generated by the imaging unit 22 has been decreased. With such a configuration, the calculation amount for image processing can be decreased, making it possible to decrease the time required for shape measurement.

Further, the extraction region setting unit 70 (or the extraction region setting unit 70A) may be configured to extract target images similar to an image of a pattern estimated from a general shape of the measurement target 3 for each of a plurality of capture images of different measurement regions captured by the imaging unit 22, and set the extraction region Ap on the basis of a plurality of target images acquired from the plurality of capture images. With such a configuration, the extraction region Ap can be set while readily identifying the characteristics of the positions of the abnormal points within the captured image, making it possible to decrease the number of abnormal points included within the range of the extraction region Ap.

[Third Embodiment]

Next, as a third embodiment of the present teaching, a structure manufacturing system that includes either the aforementioned shape measuring apparatus 100 of the first embodiment or shape measuring apparatus 100A of the second embodiment will be described.

Figure 13:
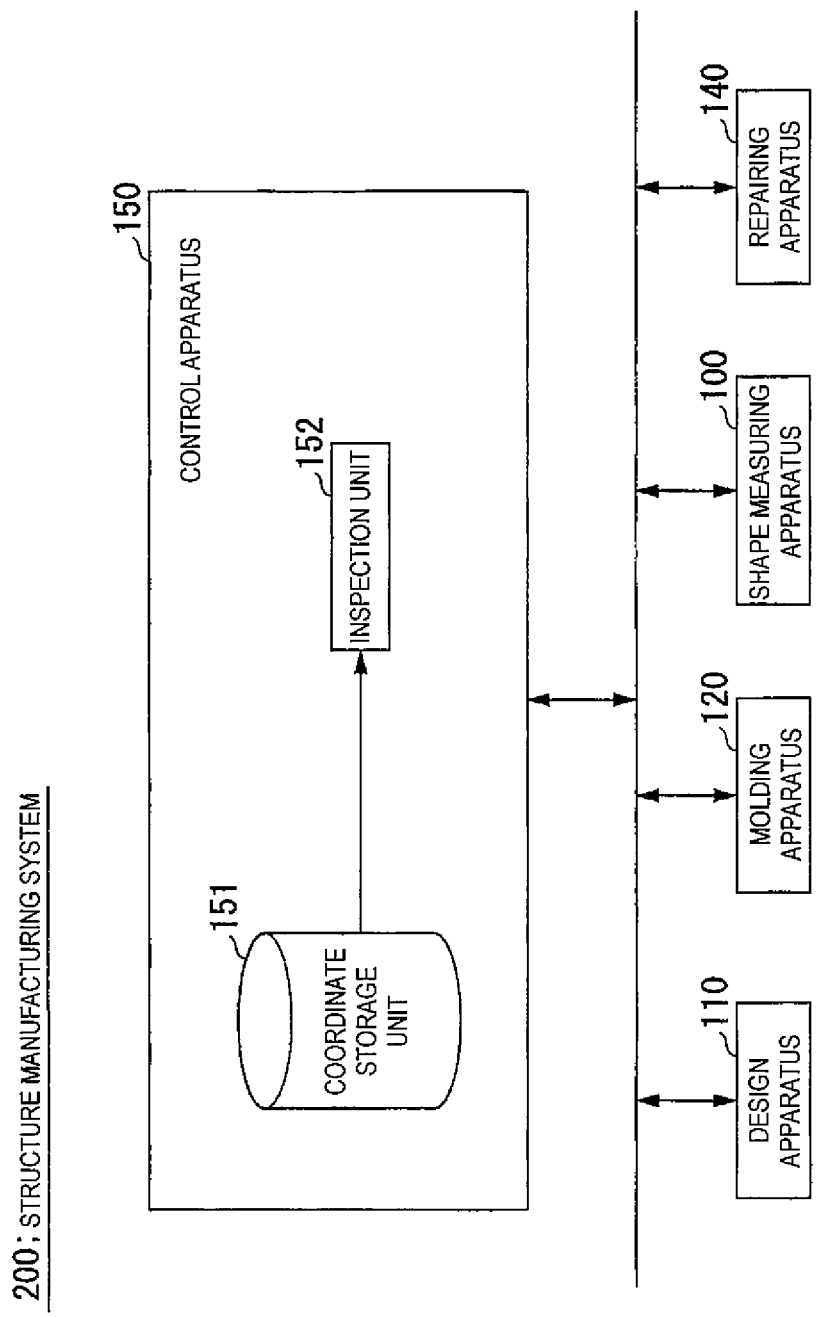
FIG. 13 is a block diagram illustrating a configuration of a structure manufacturing system according to a third embodiment of the present invention.

FIG. 13 is a block diagram illustrating a configuration of a structure manufacturing system 200 according to the third embodiment of the present teaching. The structure manufacturing system 200 includes, for example, the aforementioned shape measuring apparatus 100 (or the shape measuring apparatus 100A), a design apparatus 110, a molding apparatus 120, a control apparatus (inspecting apparatus) 150, and a repairing apparatus 140.

The design apparatus 110 generates design information on a shape of a structure, and sends the generated design information to the molding apparatus 120. The design apparatus 110 stores the generated design information in a coordinate storage unit 151 described below of the control apparatus 150. Here, the design information is information indicating coordinates of each position in the structure.

The molding apparatus 120 forms the above structure on the basis of the design information input from the design apparatus 110. The molding process of the molding apparatus 120 includes casting, forging, machining, or the like.

The shape measuring apparatus 100 (or the shape measuring apparatus 100A) measures the coordinates of the manufactured structure (measurement target 3), and sends information indicating the measured coordinates (the shape information) to the control apparatus 150.

The control apparatus 150 includes the coordinate storage unit 151 and an inspection unit 152. The coordinate storage unit 151 stores the design information input from the design apparatus 110 as previously described. The inspection unit 152 reads the design information from the coordinate storage unit 151. The inspection unit 152 compares the information (the shape information) indicating the coordinates received from the shape measuring apparatus 100 (or the shape measuring apparatus 100A) with the design information read from the coordinate storage unit 151.

The inspection unit 152 then determines, on the basis of the comparison result, whether or not the structure has been formed according to the design information. In other words, the inspection unit 152 determines whether the manufactured structure is a non-defective product. The inspection unit 152 determines whether the structure is repairable when the structure has not been molded according to the design information. In a case where the structure can be repaired, the inspection unit 152 calculates a defective area and the amount of repair on the basis of the comparison result, and sends information indicating the defective area and information indicating the amount of repair to the repairing apparatus 140. It should be noted that the present teaching is not limited to setting an extraction region determined from the capture images L1 to L3 by the shape measuring apparatus used in the inspection unit 152. For example, if a structure having substantially the same shape as the structure manufactured by the molding apparatus 120 is to be manufactured in mass quantities, one structure manufactured from the molding apparatus 120 is taken, and the inspection unit 152 projects a linear light from a direction estimated during measurement by the inspection unit 152 using another shape measuring apparatus 2, and similarly acquires an image of the linear light projected onto the structure from the direction estimated by the inspection unit 152. An image of the linear light is then acquired for each of a plurality of measurement positions, a logical sum image is generated, and an extraction region is set as described above. The extraction region thus set may be reflected into the inspection unit 152 to be inspected.

The repairing apparatus 140 machining the defective area of the structure on the basis of the information indicating the defective area and the information indicating the amount of repair received from the control apparatus 150.

Figure 14:
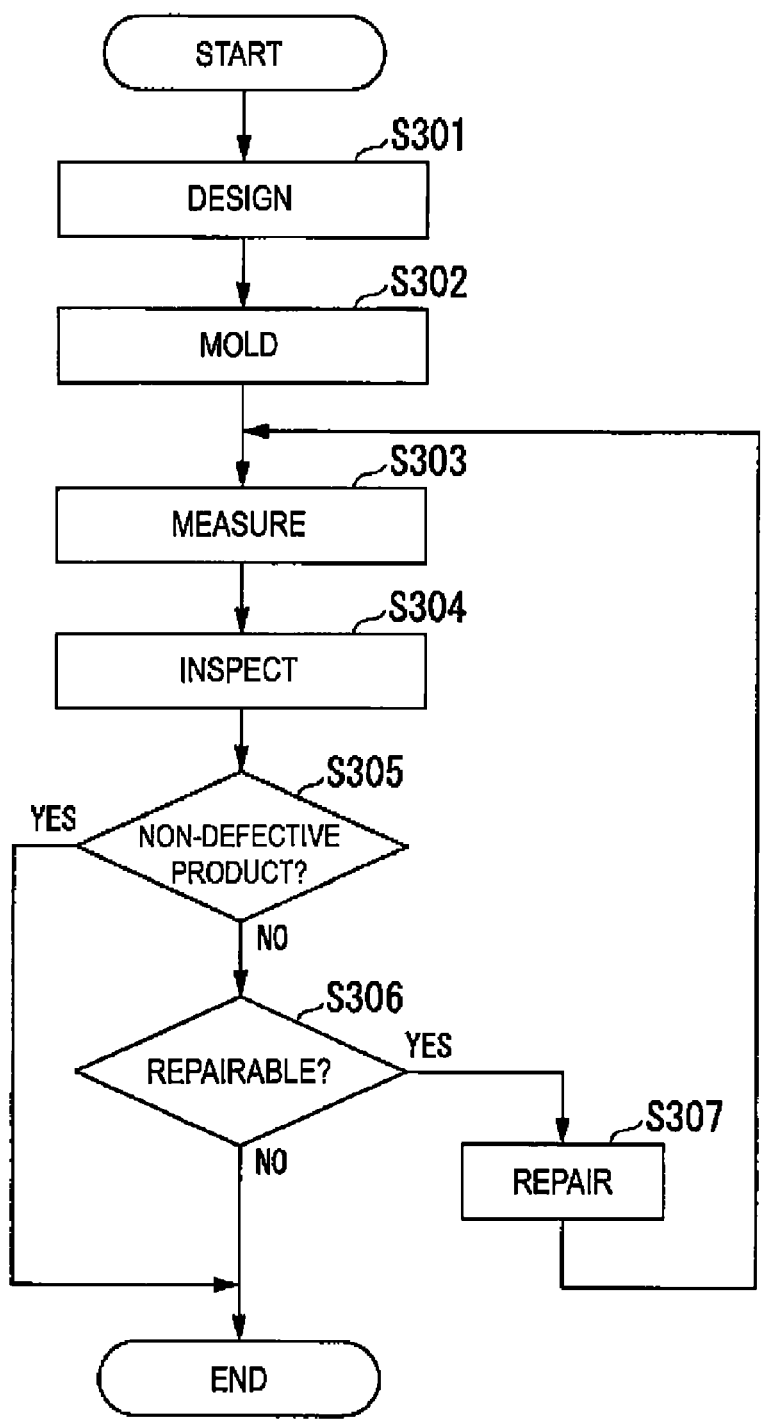
FIG. 14 is a flowchart illustrating a flow of processing carried out by the structure manufacturing system.

FIG. 14 is a flowchart illustrating a flow of processing carried out by the structure manufacturing system 200.

First, the design apparatus 110 generates the design information regarding the shape of the structure (step S301). Next, the molding apparatus 120 forms the above structure on the basis of the design information (step S302). Next, the shape measuring apparatus 100 (or the shape measuring apparatus 100A) measures the shape of the manufactured structure (step S303). Next, the inspection unit 152 of the control apparatus 150 inspects whether or not the structure has been formed according to the design information by comparing the shape information acquired by the shape measuring apparatus 100 (or the shape measuring apparatus 100A) with the above described design information (step S304).

Next, the inspection unit 152 of the control apparatus 150 determines whether or not the manufactured structure is a non-defective product (step S305). When the manufactured structure is a non-defective product (Yes in step S305), the structure manufacturing system 200 terminates the processing thereof. On the other hand, when the manufactured structure is not a non-defective product (No in step S305), the inspection unit 152 of the control apparatus 150 determines whether the manufactured structure can be repaired (step S306).

In the case where the inspection unit 152 determines that the manufactured structure can be repaired (Yes in step S306), the repairing apparatus 140 re-machines the structure (step S307), and the flow returns to the step S303. On the other hand, in the case where the inspection unit 152 determines that the manufactured structure cannot be repaired (No in step S306), the structure manufacturing system 200 terminates the processing thereof. The processing of the present flowchart terminates with the above.

Accordingly, the shape measuring apparatus 100 (or the shape measuring apparatus 100A) of the above described embodiment can easily remove the abnormal points of the capture image and measure the coordinates (three-dimensional shape) of a structure, making it possible for the structure manufacturing system 200 to accurately determine whether or not the manufactured structure is a non-defective product. Moreover, the structure manufacturing system 200 can re-machine and repair the structure in a case where the structure is not a non-defective product.

The embodiments of the present teaching have been described above, and then the following provides a supplementary explanation of the corresponding relationship between the present teaching and the aforementioned embodiments.

That is, the projecting unit of the present teaching corresponds to the projecting unit 21, and the imaging unit of the present teaching corresponds to the imaging unit 22. Further, the extraction region setting unit of the present teaching corresponds to either of the extraction region setting units 70, 70A. Further, the structure manufacturing system of the present teaching corresponds to the structure manufacturing system 200, the design apparatus of the present teaching corresponds to the design apparatus 110, the molding apparatus of the present teaching corresponds to the molding apparatus 120, and the inspecting apparatus of the present teaching corresponds to the control apparatus 150.

It should be noted that, in the above embodiments, the structure manufacturing system 200 includes the design apparatus 110 that generates the structure design information relating to the shape of the structure, the molding apparatus 120 that forms the structure on the basis of the structure design information, the shape measuring apparatus 100 (or the shape measuring apparatus 100A) that measures the shape of the manufactured structured on the basis of capture images, and the inspecting apparatus (control apparatus 150) that compares the shape information acquired by the measurement with the structure design information. Accordingly, the shape measuring apparatus 100 (or the shape measuring apparatus 100A) can easily remove abnormal points of a capture image and measure the coordinates (three-dimensional shape) of a structure, and thus the structure manufacturing system 200 can accurately determine whether or not the manufactured structure is a non-defective product.

The embodiments of the present teaching have been described in detail above with reference to the drawings, and the specific configuration is not limited to the embodiments and any modification can be made as desired without departing from the spirit and scope of the present teaching. For example, the shape measuring apparatus of the present teaching does not necessarily need to include the position calculating unit. The position calculating unit, for example, may be provided in another computer connected to the shape measuring apparatus through a wired or wireless network.

It should be noted that the control unit 40 and the controller included in each device (hereinafter generally referred to as "controller CONT") or each component that includes this controller CONT in each of the above embodiments may be realized by dedicated hardware, or by a memory and a microprocessor.

It should be noted that the controller CONT or each component that includes the controller CONT may be realized by dedicated hardware, or the controller CONT or each component that includes the controller CONT may include a memory and a central processing unit (CPU), and the function of the controller CONT or of each component that includes the controller CONT may be realized by loading a program that performs the function into a memory and executing the program.

Further, processing by the controller CONT or by each component that includes the controller CONT may be performed by recording a program that performs the function of the controller CONT or of each component that includes the controller CONT on a computer-readable recording medium, loading the program recorded on the recording medium into a computer system, and executing the program. The "computer system" described here includes an OS and hardware such as peripheral equipment, and the like.

In addition, a "computer system" is assumed to include a home page providing environment (or display environment) when a WWW system is used.

A "computer-readable recording medium" refers to a flexible disk, a magneto-optical disk, a ROM, a portable medium such as a CD-ROM, a storage device such as a hard disk built into a computer system, or the like. Further, the "computer-readable recording medium" also includes a medium that dynamically holds a program for a short period of time such as a communication line used when the program is transmitted through a network such as the Internet or through a communication channel such as a telephone line, or a medium that holds a program for a certain amount of time such as a volatile memory in a computer system serving as a server or a client in such a case. Further, the above program may be a program that performs a portion of the aforementioned function, or a program that is configured to perform the aforementioned function in combination with a program already recorded in the computer system.

What is claimed is:

1. A shape measuring apparatus comprising:
   a projecting unit that projects a measurement beam onto a measurement region of a measurement target;
   an imaging unit that is arranged at a position different from the projection unit, and that captures an image of the measurement region onto which the measurement beam is projected;
   a movement mechanism that is configured to support the projection unit and the imaging unit, and that relatively moves one of the projecting unit and the imaging unit with respect to the measurement target so that a position of the measurement region of the measurement target changes; and
   an extraction region setting unit that is connected to the imaging unit communicably, and that sets an extraction region for image information based on positions of images of the measurement beam in a composite image of a plurality of capture images captured by the imaging unit and superimposed on each other, the positions of images of the measurement beam being captured by the imaging unit when the measurement beam is projected onto different measurement regions, the image information being used for calculating a position of the measurement target.

2. The shape measuring apparatus according to claim 1, wherein
   the extraction region setting unit further includes a logical sum image generating unit that generates a composite image that is a logical sum image from capture images of different measurement regions captured by the imaging unit;
   the extraction region setting unit allowing an extraction region to be set with respect to image data that is generated by the imaging unit from the logical sum image.

3. The shape measuring apparatus according to claim 2, wherein
   the logical sum image generating unit generates the logical sum image for the plurality of capture images by setting a pixel value of each identical pixel that satisfies a predetermined condition as a position of the pixel.

4. The shape measuring apparatus according to claim 2, wherein
   the logical sum image generating unit generates the logical sum image including at least one capture image acquired by the imaging unit when the measurement beam is projected onto an end portion of a measurement target range of the measurement target.

5. The shape measuring apparatus according to claim 2, wherein
on the basis of at least two of the capture images in which images of at least two of a plurality of the measurement regions of the measurement target are captured by the imaging unit, the logical sum image generating unit generates a logical sum image indicating a logical sum of the capture images.

6. The shape measuring apparatus according to claim 1, wherein
the extraction region setting unit extracts a target image similar to an image of a measurement beam estimated from a positional relationship between the projecting unit and the imaging unit with respect to the measurement target for each of a plurality of capture images captured by the imaging unit when the measurement beam is projected onto different measurement regions, and sets an extraction region on the basis of positions of a plurality of the target images acquired from the plurality of capture images.

7. The shape measuring apparatus according to claim 6, wherein
the estimated image of the measurement beam is an image estimated on the basis of design data of the measurement target.

8. The shape measuring apparatus according to claim 7, further comprising a shape data storage unit that holds general shape data of the measurement target.

9. The shape measuring apparatus according to claim 1, wherein
the extraction region setting unit sets an extraction region from image information that includes a capture image of an image of the measurement beam positioned on an outermost side among images of the measurement beam captured by the imaging unit when the measurement beam is projected onto the different measurement regions.

10. The shape measuring apparatus according to claim 1, further comprising a position calculating unit that calculates a position of the measurement target on the basis of the image information within the extraction region set by the extraction region setting unit among capture images captured by the imaging unit.

11. The shape measuring apparatus according to claim 1, wherein
the extraction region setting unit sets at least two of the extraction regions having different shapes from each other.

12. The shape measuring apparatus according to claim 1, wherein
the extraction region setting unit sets an extraction region within the capture image generated by the imaging unit on the basis of an image in which an amount of information for the capture image generated by the imaging unit is decreased.

13. The shape measuring apparatus according to claim 12, wherein
the extraction region setting unit sets on the basis of an image in which a number of gradations is decreased, the image serving as an image in which the amount of information for the capture image generated by the imaging unit is decreased.

14. A structure manufacturing system comprising:
a design apparatus that generates structure design information relating to a shape of a structure;
a molding apparatus that forms the structure on the basis of the structure design information;
the shape measuring apparatus described in claim 1 that measures a shape of the formed structure on the basis of a capture image; and
an inspecting apparatus that compares shape information acquired by the measurement with the structure design information.

15. A shape measuring apparatus comprising:
a projecting unit that projects a measurement beam onto a measurement region of a measurement target;
an imaging unit that is arranged at a position different from the projection unit, and that captures an image of the measurement region onto which the measurement beam is projected;
a movement mechanism that is configured to support the projection unit and the imaging unit, and that relatively moves one of the projecting unit and the imaging unit with respect to the measurement target so that a position of the measurement region of the measurement target changes;
a display unit that is connected to the imaging unit communicably, and that displays a composite image of a plurality of capture images superimposed on each other, the plurality of capture images being captured by the imaging unit when the measurement beam is projected onto different measurement regions;
an input unit that is connected to the imaging unit communicably, and that is configured to be input information relating to a selection region for selecting a portion of the composite image of the plurality of capture images;
an extraction region setting unit that is connected to the imaging unit communicably, and that sets an extraction region on the basis of information relating to the selection region; and
a position calculating unit that is connected to the imaging unit communicably, and that calculates a position of the measurement target based on positions of images of the measurement beam in a capture image within the extraction region among capture images captured by the imaging unit.

16. The shape measuring apparatus according to claim 15, wherein
the extraction region setting unit further includes:
a logical sum image generating unit that generates a composite image that is a logical sum image from capture images captured by the imaging unit when the measurement beam is projected onto different measurement regions; and
wherein the display unit that displays the logical sum image generated by the logical sum image generating unit; and
the input unit inputs information indicating the extraction region with respect to the logical sum image displayed by the display unit; and
the extraction region setting unit setting the extraction region on the basis of information indicating the extraction region input to the input unit.

17. The shape measuring apparatus according to claim 15, wherein the extraction region setting unit further includes:
a logical sum image generating unit that generates a logical sum image from the capture images captured by the imaging unit when the measurement beam is projected onto different measurement regions;

the extraction region setting unit setting an extraction region with respect to a capture image generated by the imaging unit from the logical sum image.

18. The shape measuring apparatus according to claim 17, wherein the logical sum image generating unit generates the logical sum image for the plurality of capture images by setting a pixel value of each identical pixel that satisfies a predetermined condition as a pixel value of a position of the pixel.

19. The shape measuring apparatus according to claim 17, wherein the logical sum image generating unit generates the logical sum image including at least one capture image acquired by the imaging unit when the measurement region is positioned on an end portion of a measurement target range of the measurement target.

20. The shape measuring apparatus according to claim 17, wherein on the basis of at least two of the capture images in which images of at least two of a plurality of the measurement regions of the measurement target are captured by the imaging unit, the two measurement regions being different from each other, the logical sum image generating unit generates a logical sum image indicating a logical sum of the capture images.

21. A shape measuring method comprising:

an imaging step of generating a capture image in which an image of a measurement region of a measurement target is captured by projecting a measurement beam onto the measurement region;

a projecting step of projecting a pattern onto the measurement region of the measurement target from a direction that differs from a imaging direction in the imaging step so that a capture image to be captured in the imaging step is captured as an image in which the pattern is projected onto the measurement region of the measurement target;

an extraction region setting step of setting an extraction region indicating an image of an extraction target in the capture image based on positions of images of the measurement beam in an image having at least, among a composite image of a plurality of the capture images in which images of different measurement regions of the measurement target are captured in the imaging step and superimposed on each other, a capture image captured when an image of the pattern is positioned on an outermost side of the measurement region; and a position calculating step of calculating a position of the measurement target on the basis of the capture image of the extraction region within the capture image generated in the imaging step.

22. The shape measuring method according to claim 21, further comprising a logical sum image generating step of acquiring a composite image that is a logical sum image from image data of different measurement regions captured in the imaging step;

the extraction region setting step includes:

a displaying step of displaying the logical sum image generated in the logical sum image generating step; and an input step of inputting information indicating the extraction region on the basis of the logical sum image displayed in the displaying step;

the extraction region setting step of setting an extraction region within the capture image generated in the imaging step on the basis of information indicating the extraction region input in the input step.

23. A structure manufacturing method comprising:

a structure design information generating step of generating structure design information relating to a shape of a structure;

a structure forming step of forming the structure on the basis of the structure design information;

a measuring step of measuring a shape of the formed structure on the basis of a capture image generated using the shape measuring method described in claim 21; and a comparing step of comparing shape information acquired by the measurement with the structure design information.

24. A non-transitory computer-readable medium storing a shape measuring program that causes a computer to execute a method, the method comprising:

an imaging step of generating a capture image in which an image of a measurement target is captured by projecting a measurement beam onto a measurement region;

a projecting step of projecting a pattern onto a measurement region of the measurement target from a direction that differs from a imaging direction in the imaging step so that a capture image to be captured in the imaging step is captured as an image in which the pattern is projected onto the measurement target; and an extraction region setting step of setting an extraction region for extracting image information used for calculating a position of the measurement target based on positions of images of the measurement beam in a capture image, on the basis of a composite image of a plurality of capture images of the pattern in which images of different measurement regions of the measurement target are captured in the imaging step and superimposed on each other.

* * * * *